United States Patent
Li et al.

(10) Patent No.: US 12,238,810 B2
(45) Date of Patent: Feb. 25, 2025

(54) COMMUNICATIONS METHOD, APPARATUS, AND SYSTEM

(71) Applicant: HUAWEI TECHNOLOGIES CO.,LTD., Guangdong (CN)

(72) Inventors: Meng Li, Beijing (CN); Jiangwei Ying, Beijing (CN); Shengfeng Xu, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 17/523,817

(22) Filed: Nov. 10, 2021

(65) Prior Publication Data

US 2022/0070967 A1     Mar. 3, 2022

Related U.S. Application Data

(63) Continuation of application No. PCT/CN2020/090331, filed on May 14, 2020.

(30) Foreign Application Priority Data

May 15, 2019   (CN) .......................... 201910408185.2

(51) Int. Cl.
*H04W 76/30*     (2018.01)
*H04W 4/40*      (2018.01)
(Continued)

(52) U.S. Cl.
CPC .............. *H04W 76/30* (2018.02); *H04W 4/40* (2018.02); *H04W 8/24* (2013.01); *H04W 60/00* (2013.01)

(58) Field of Classification Search
CPC ......... H04W 76/30; H04W 4/40; H04W 8/24; H04W 60/00
(Continued)

(56) References Cited

U.S. PATENT DOCUMENTS

2017/0280378 A1   9/2017   Atarius et al.
2019/0007500 A1   1/2019   Kim et al.
(Continued)

FOREIGN PATENT DOCUMENTS

CN   108260163 A   7/2018
CN   108541017 A   9/2018
(Continued)

OTHER PUBLICATIONS

SA WG2 Meeting #132,S2-1903482,Clarification on the procedures for Service Authorization,vivo,Apr. 8 - 12, 2019, Xi an, China,total 3 pages.
(Continued)

*Primary Examiner* — Ted M Wang

(57) ABSTRACT

Embodiments of this application disclose a communications method, apparatus, and system, and relate to the communications field, so that an access network device reserves a context of a V2X terminal, thereby ensuring that the V2X terminal implements PC5 interface communication. The method includes: A core network device obtains capability information indicating that the V2X terminal supports PC5 interface communication. The core network device maintains or skips releasing a signaling connection between the V2X terminal and the core network device based on the obtained capability information after completion of V2X terminal registration.

17 Claims, 12 Drawing Sheets

(51) Int. Cl.
*H04W 8/24* (2009.01)
*H04W 60/00* (2009.01)

(58) Field of Classification Search
USPC .................................................... 455/435.1
See application file for complete search history.

(56) References Cited

U.S. PATENT DOCUMENTS

| | | | |
|---|---|---|---|
| 2019/0014612 A1 | 1/2019 | Lee | |
| 2019/0037448 A1 | 1/2019 | Shan et al. | |
| 2019/0289459 A1* | 9/2019 | Shan | .............. H04W 76/25 |
| 2022/0095260 A1* | 3/2022 | Shan | .............. H04W 60/04 |

FOREIGN PATENT DOCUMENTS

| | | |
|---|---|---|
| EP | 3512294 A1 | 7/2019 |
| EP | 3764671 A1 | 1/2021 |
| WO | 2018066876 A1 | 4/2018 |
| WO | 2018066905 A1 | 4/2018 |

OTHER PUBLICATIONS

3GPP TSG-SA WG2 Meeting #129,S2-1810285,Clarification on signalling connection release condition in Registration procedure,LG Electronics,Dongguan, China, Oct. 15 - 19, 2018,total 11 pages.
3GPP TSG-SA WG2 Meeting #132,S2-1903777,Service Gap Control Capability Indication in UE s MM Core Network Capability,Huawei, HiSilicon,Xi"an, People"s Republic of China, Apr. 8-Apr. 12, 2019,total 13 pages.
Qualcomm Incorporated, Ericsson, Verizon Wireless, ATandT, Addition of UE NAS capability for support of dual connectivity with Nr. 3GPP TSG-CT WG1 Meeting #105, Krakow (Poland), Aug. 21-25, 2017, C1-173523, 15 pages.
3GPP TS 23.502 V16.0.2 (Apr. 2019), 3rd Generation Partnership Project; Technical Specification Group Services and System Aspects; Procedures for the 5G System; Stage 2(Release 16), 419 pages.
Samsung, CP Data BO capability indication. 3GPP TSG-CT WG1 Meeting #101bis, Spokane (WS), USA, Jan. 16-20, 2017, C1-170264, 13 pages.
3GPP TS 23.287 V0.3.0 (Apr. 2019), 3rd Generation Partnership Project; Technical Specification Group Services and System Aspects; Architecture enhancements for 5G System (5GS) to support Vehicle-to-Everything (V2X) services (Release 16), 39 pages.
Huawei, HiSilicon, Intel, N1 CIoT capability indication. 3GPP TSG-CT WG1 Meeting #116, Xian, P.R. of China, Apr. 8-12, 2019, C1-192771, 24 pages.
Huawei, HiSilicon, No NAS signalling release for V2X Ue authorized to use PCS communication. SA WG2 Meeting #134, Sapporo, Hokkaido, Japan, Jun. 24-28, 2019, S2-1908197, 2 pages.
3GPP TR 23.786 V1.1.0 (Jan. 2019), 3rd Generation Partnership Project; Technical Specification Group Services and System Aspects; Study on architecture enhancements for EPS and 5G System to support advanced V2X services (Release 16), 111 pages.

* cited by examiner the PC5 interface communication.

COMMUNICATIONS METHOD, APPARATUS, AND SYSTEM

CROSS-REFERENCE TO RELATED APPLICATIONS

This application is a continuation of International Application No. PCT/CN2020/090331, filed on May 14, 2020, which claims priority to Chinese Patent Application No. 201910408185.2, filed on May 15, 2019, which is incorporated herein by reference in its entirety.

TECHNICAL FIELD

Embodiments of this application relate to the communications field, and in particular, to a communications method, apparatus, and system.

BACKGROUND

With rapid development of communications technologies, a vehicle to everything (V2X) technology has been widely used. In a V2X system, two communication manners may be used. One is Uu interface communication. To be specific, a base station is used as a control center, and data between a vehicle and an infrastructure or between a vehicle and another vehicle is transmitted by using a Uu interface of the base station. The other is PC5 interface communication. To be specific, data between vehicles is directly transmitted by using a PC5 interface.

In V2X communication, if a V2X terminal is in a coverage area of a cellular network, the V2X terminal may perform communication by using the Uu interface to implement communication with a large bandwidth and wide coverage, or may perform communication by using the PC5 interface to implement directly communication between vehicles and ambient environment nodes with low latency and high reliability. If a V2X terminal is outside a coverage area of the cellular network, the V2X device may perform communication by using the PC5 interface in an area in which no network is deployed, to meet a driving safety requirement.

For the PC5 interface communication, although data of the V2X terminal does not need to be forwarded by a base station, in some scenarios, for example, PC5 interface communication in a base station scheduling mode, the base station also needs to allocate a PC5 interface resource to the V2X terminal based on a context of the V2X terminal. However, according to a communications mechanism of a 5th generation (5G) mobile communications system, when accessing a network, a terminal initiates registration to a network, to establish a connection between the terminal and an access network device and a connection between the access network device and a core network device. After completion of registration for the terminal, if the core network device determines that the terminal has no data or signaling transmission requirement, the core network device may initiate a communication connection and a signaling connection release to save resources. In a process of releasing the communication connection and the signaling connection, the access network device deletes a stored context of the terminal. Therefore, how the access network device reserves the context of the V2X terminal becomes an urgent problem to be resolved.

SUMMARY

Embodiments of this application provide a communications method, apparatus, and system so that an access network device reserves a context of a V2X terminal, thereby ensuring that the V2X terminal implements PC5 interface communication.

To achieve the foregoing objective, the following technical solutions are applied to the embodiments of this application.

According to a first aspect, a communications method is provided. The method may include: A core network device obtains indication information, where the indication information is used to indicate to maintain or skip releasing a signaling connection between the core network device and a V2X terminal after completion of registration for the V2X terminal, or the indication information is used to indicate to maintain or skip releasing a communication connection of a V2X terminal between the core network device and an access network device of the V2X terminal after completion of registration for the V2X terminal. The core network device maintains or skips releasing the communication connection of the V2X terminal between the core network device and the access network device of the V2X terminal based on the obtained indication information.

According to the communications method provided in this application, the core network device maintains or skips releasing the communication connection of the V2X terminal between the core network device and the access network device of the V2X terminal based on the indication information. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements PC5 interface communication.

In wireless communication, a terminal initiates registration to a network, and establishes, in a registration procedure, a signaling connection (for example, an N1 connection in 5G) between the core network device and the terminal, a communication connection (for example, an N2 connection in 5G) of the terminal between the core network device and an access network device of the terminal, and a connection (for example, an RRC connection in 5G) between the terminal and the access network device, so that the terminal enters a connected mode. After completion of registration for the terminal, if the core network device determines that the terminal has no data or signaling transmission requirement, the core network device sends a connection release request message to the access network device, to release the signaling connection between the core network device and the terminal, the communication connection of the terminal between the core network device and the access network device of the terminal, and the connection between the terminal and the access network device. The access network device deletes an internally stored context of the terminal. In this case, the terminal enters an idle mode. It can be learned that, releasing the signaling connection between the core network device and the terminal, releasing the communication connection of the terminal between the core network device and the access network device of the terminal, releasing the connection between the terminal and the access network device, deleting the internally stored context of the terminal by the access network device, and entering the idle mode by the terminal are equivalent concepts, and can be replaced with each other.

In other words, maintaining or skipping releasing the signaling connection between the core network device and the terminal, maintaining or skipping releasing the communication connection of the terminal between the core network device and the access network device of the terminal, maintaining or skipping releasing the connection between the terminal and the access network device, reserving the internally stored context of the terminal by the access network device, and maintaining the connected mode by the terminal are equivalent concepts, and can be replaced with each other.

Therefore, the indication information described in this application is used to indicate to maintain or skip releasing the signaling connection between the core network device and the V2X terminal after completion of registration for the V2X terminal, or the indication information is used to indicate to maintain or skip releasing the communication connection of the V2X terminal between the core network device and the access network device of the V2X terminal after completion of registration for the V2X terminal. In addition, the indication information may be further used to indicate to maintain or skip releasing the connection between the access network device and the V2X terminal after completion of registration for the V2X terminal, or the indication information may be further used to indicate the access network device to reserve the internally stored context of the terminal after completion of registration for the V2X terminal, or the indication information may be further used to indicate the V2X terminal to maintain the connected mode after completion of registration for the V2X terminal.

In a possible implementation, that a core network device obtains indication information may be implemented as follows: The core network device receives the indication information from the V2X terminal. In this implementation, the V2X terminal indicates, by using the indication information, the core network device to maintain or skip releasing the connection after completion of registration for the V2X terminal, so that the access network device reserves the context of the V2X terminal, thereby ensuring that the V2X terminal implements the PC5 interface communication.

For example, the V2X terminal may send the indication information to the core network device when determining that there is a PC5 interface communication requirement that the access network device needs to allocate a resource.

In a possible implementation, the V2X terminal may add the indication information to a registration request message for sending. The indication information is sent by reusing the message in an existing registration procedure, thereby saving signaling resources.

In a possible implementation, the V2X terminal may directly send the indication information to the core network device. This avoids a change to the message in the existing registration procedure. Therefore, implementation is simple, and compatibility is high.

In a possible implementation, when the core network device receives the indication information from the V2X terminal, the indication information may include one or more of the following: a type of the V2X terminal, a first indication, and capability information used to indicate that the V2X terminal supports the PC5 interface communication. The first indication is used to indicate that there is to-be-processed uplink signaling in the V2X terminal. The core network device maintains or skips releasing, based on an indication of the V2X terminal, a connection for a V2X terminal that has one or more features of a type that is V2X, supporting the PC5 interface communication, and having to-be-processed uplink signaling, so that the access network device reserves the context of the V2X terminal, thereby ensuring the V2X terminal can implement the PC5 interface communication.

That there is the to-be-processed uplink signaling may be equivalent to a case in which there is an uplink non-access stratum (NAS) message other than a to-be-processed first service request, where the first service request is used to activate a user plane resource; or there is a to-be-processed second service request, where the second service request is used not to activate a user plane resource. The foregoing three concepts may be replaced with each other.

In a possible implementation, the indication information may include one or more of the following: a type of the V2X terminal and capability information indicating that the V2X terminal supports the PC5 interface communication. Correspondingly, that a core network device obtains indication information may be implemented as follows: The core network device obtains the indication information from subscription information of the V2X terminal. The core network device obtains the indication information from the subscription information, and only processing logic of the core network device needs to be modified, and logic of other network elements does not need to be modified. Therefore, implementation is simple, and compatibility is high.

The core network device may obtain the subscription information of the V2X terminal from a subscription information management network element based on an identifier of the V2X terminal.

In a possible implementation, the indication information may include: information used to indicate that the V2X terminal is performing PC5 interface communication, or capability information used to indicate that the access network device supports PC5 interface communication. Correspondingly, that a core network device obtains indication information may be implemented as follows: The core network device receives the indication information from the access network device. The core network device obtains the indication information from the access network device, and only processing logic of the access network device needs to be modified, thereby reducing impact on the V2X terminal.

In a possible implementation, the indication information may include a reject message of the connection release request message. The connection release request message is used to release the communication connection of the V2X terminal between the core network device and the access network device of the V2X terminal. Correspondingly, the communications method provided in this application may further include: The core network device sends the connection release request message to the access network device. Correspondingly, that a core network device obtains indication information may be implemented as follows: The core network device receives the reject message of the connection release request message from the access network device. The core network device obtains the indication information from the access network device, and only processing logic of the access network device needs to be modified, thereby reducing impact on the V2X terminal.

In a possible implementation, that the core network device maintains or skips releasing the communication connection of the V2X terminal between the core network device and the access network device of the V2X terminal based on the indication information may be implemented as follows: The core network device skips sending the connection release request message to the access network device based on the indication information.

That the core network device sends the connection release request message to the access network device may be implemented as follows: The core network device starts a timer, and sends the connection release request message to the access network device after the timer expires. Correspondingly, that the core network device skips sending the connection release request message to the access network device based on the indication information may be implemented as follows: The core network device skips starting a timer after receiving the indication information, or after receiving the indication information, the core network cancels a timer that has been started but has not expired.

According to a second aspect, this application provides another communications method. The method may include: When a V2X terminal transmits V2X service data through PC5 interface communication in a base station scheduling mode, or when a V2X terminal transmits V2X service data by using a spectrum controlled by a current camped cell, the V2X terminal sends indication information to a core network device. The indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and an access network device of the V2X terminal after completion of registration for the V2X terminal. Then, the V2X terminal sends a resource request message to the access network device of the V2X terminal. The resource request message is used to request a PC5 interface communication resource from the access network device, and the PC5 interface communication resource is used to transmit the V2X service data.

According to the communications method provided in this application, when the V2X terminal has a PC5 interface communication requirement that the access network device needs to allocate a resource, the V2X terminal sends the indication information to the core network device, so that the core network device maintains or skips releasing the communication connection of the V2X terminal between the core network device and the access network device of the V2X terminal based on the indication information. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

It should be noted that content of the communications method according to the second aspect of this application is the same as that of the communications method according to the first aspect, but is different in terms of description. The first aspect describes specific implementation of the solution from a perspective of the core network device, and the second aspect of this application describes the solution from a perspective of the V2X terminal. Therefore, for specific implementation of the second aspect, refer to the specific implementation of the first aspect and implementations of the first aspect.

That a V2X terminal transmits V2X service data through PC5 interface communication in a base station scheduling mode may be understood as follows: The V2X terminal determines to transmit the V2X service data through the PC5 interface communication in the base station scheduling mode. The two concepts may be replaced with each other. That a V2X terminal transmits V2X service data by using a spectrum controlled by a current camped cell may be understood as follows: The V2X terminal determines to transmit the V2X service data by using the spectrum controlled by the current camped cell. The two concepts may be replaced with each other.

In a possible implementation, that the V2X terminal sends indication information to a core network device may be implemented as follows: The V2X terminal sends a registration request message to the core network device, where the registration request message carries the indication information. In this implementation, the V2X terminal indicates, by using the indication information, the core network device to maintain or skip releasing a connection after completion of registration for the V2X terminal, so that the access network device reserves the context of the V2X terminal, thereby ensuring that the V2X terminal implements the PC5 interface communication. The indication information is sent by reusing the message in an existing registration procedure, thereby saving signaling resources.

In a possible implementation, that the V2X terminal sends indication information to a core network device may be implemented as follows: The V2X terminal sends the indication information to the core network device. This avoids a change to the message in the existing registration procedure. Therefore, implementation is simple, and compatibility is high.

In a possible implementation, the indication information may include one or more of the following: a type of the V2X terminal, a first indication, and capability information indicating that the V2X terminal supports the PC5 interface communication. The first indication is used to indicate that there is to-be-processed uplink signaling in the V2X terminal. The V2X terminal requests, by using the indication information, the core network device to maintain or skip releasing a connection for the V2X terminal that has one or more features of a type that is V2X, supporting the PC5 interface communication, and having to-be-processed uplink signaling, so that the access network device reserves the context of the V2X terminal, thereby ensuring the V2X terminal can implement the PC5 interface communication.

It should be noted that, that there is the to-be-processed uplink signaling has been described in detail in the first aspect, and details are not described herein again.

In a possible implementation, when the indication information includes the first indication, the communications method according to the second aspect of this application may further include: After receiving a registration accept message, the V2X terminal sends a NAS message to the core network device, where the NAS message includes a service request message, and the service request message is used to request not to activate a user plane resource.

According to a third aspect, this application provides yet another communications method. The method may include: An access network device receives a resource request message from a V2X terminal, where the resource request message is used to request to allocate a PC5 interface communication resource to the V2X terminal. The access network device sends indication information to a core network device based on the resource request message, where the indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal.

According to the communications method provided in this application, when the access network device receives the resource request message from the V2X terminal, the access network device determines that the V2X terminal has a PC5 interface communication requirement that the access network device needs to allocate a resource, and the access network device sends the indication information to the core network device, so that the core network device maintains or skips releasing the communication connection of the V2X terminal between the core network device and the access network device of the V2X terminal based on the indication information. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements PC5 interface communication.

That an access network device receives a resource request message from a V2X terminal may be understood as follows: The access network device obtains information indicating that the V2X terminal is performing PC5 interface communication. The two concepts may be replaced with each other.

It should be noted that content of the communications method according to the third aspect of this application is the same as that of the communications method according to the first aspect, but is different in terms of description. The first aspect describes specific implementation of the solution from a perspective of the core network device, and the third aspect of this application describes the solution from a perspective of the access network device. Therefore, for specific implementation of the third aspect, refer to the specific implementation of the first aspect and implementations of the first aspect.

In a possible implementation, the indication information includes: information used to indicate that the V2X terminal is performing PC5 interface communication, or capability information used to indicate that the access network device supports PC5 interface communication. In this implementation, specific content of the indication information provided by the access network device is provided. The core network device obtains the indication information from the access network device, and only processing logic of the access network device needs to be modified, thereby reducing impact on the V2X terminal.

In a possible implementation, the indication information may include a reject message of a connection release request message, and the connection release request message is used to release the communication connection of the V2X terminal between the core network device and the access network device of the V2X terminal. After the access network device receives the resource request message, the method provided in this embodiment of this application may further include: The access network device receives the connection release request message from the core network device. Correspondingly, that the access network device sends indication information to a core network device based on the resource request message may be implemented as follows: The access network device sends the reject message of the connection release request message to the core network device based on the resource request message and the connection release request message. In this implementation, specific content of the indication information provided by the access network device is provided. The core network device obtains the indication information from the access network device, and only processing logic of the access network device needs to be modified, thereby reducing impact on the V2X terminal.

In a possible implementation, that the access network device sends the reject message of the connection release request message to the core network device based on the resource request message and the connection release request message may be implemented as follows: The access network device starts a timer when receiving the resource request message. If the timer does not expire when the access network device receives the connection release request message, the access network device sends the reject message of the connection release request message to the core network device. The timer is configured to control duration in which a connection is maintained or skipped releasing for the PC5 interface communication of the V2X terminal. This prevents impact on network performance caused by maintaining or skipping releasing the connection for a long time.

According to a fourth aspect, this application provides another communications method, including: A core network device obtains capability information used to indicate that a V2X terminal supports PC5 interface communication. The core network device maintains or skips releasing a signaling connection between the V2X terminal and the core network device based on the capability information after completion of registration for the V2X terminal.

According to the communications method provided in this application, the core network device maintains or skips releasing, based on the capability information indicating that the V2X terminal supports the PC5 interface communication, the signaling connection between the V2X terminal and the core network device after completion of registration for the V2X terminal. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

In a possible implementation, that a core network device obtains capability information used to indicate that a V2X terminal supports PC5 interface communication may be implemented as follows: The core network device may receive the capability information from the V2X terminal. In this implementation, the V2X terminal indicates, by using the capability information, the core network device to maintain or skip releasing a connection after completion of registration for the V2X terminal, so that the access network device reserves the context of the V2X terminal, thereby ensuring that the V2X terminal implements the PC5 interface communication.

In a possible implementation, the capability information may be carried in a registration request message. The capability information is sent by reusing the message in an existing registration procedure, thereby saving signaling resources.

In a possible implementation, that the core network device maintains or skips releasing a signaling connection between the V2X terminal and the core network device based on the capability information after completion of registration for the V2X terminal includes: The core network device skips sending a connection release request message to an access network device based on the capability information after completion of registration for the V2X terminal.

In a possible implementation, that the core network device maintains or skips releasing a signaling connection between the V2X terminal and the core network device based on the capability information after completion of registration for the V2X terminal includes: The core network device maintains or skips releasing the signaling connection between the V2X terminal and the core network device based on subscription information of the V2X terminal and the capability information after completion of registration for the V2X terminal.

In a possible implementation, the core network device may be an access and mobility management function (AMF) entity.

It should be noted that the capability information in the communications method according to the fourth aspect of this application may be used as a possible implementation of the indication information in the communications method according to the first aspect. For specific implementation of the communications method according to the fourth aspect, refer to the specific implementation of the first aspect.

According to a fifth aspect, this application provides a communications apparatus. The apparatus may be a core network device, an apparatus or a chip system in a core network device, or an apparatus that can be used with a core network device. The communications apparatus may implement functions performed by the core network device in the foregoing aspect or the possible designs, and the functions may be implemented by hardware, or may be implemented by hardware executing corresponding software. The hardware or the software includes one or more modules corresponding to the foregoing functions. For example, the communications apparatus may include an obtaining unit and a processing unit.

In a possible implementation, the obtaining unit is configured to obtain indication information, where the indication information is used to indicate to maintain or skip releasing a signaling connection between the core network device and a V2X terminal after completion of registration for the V2X terminal, or the indication information is used to indicate to maintain or skip releasing a communication connection of the V2X terminal between the core network device and an access network device of the V2X terminal after completion of registration for the V2X terminal. The processing unit is configured to maintain or skip releasing the communication connection of the V2X terminal between the core network device and the access network device of the V2X terminal based on the indication information obtained by the obtaining unit.

In another possible implementation, the obtaining unit is configured to obtain capability information used to indicate that the V2X terminal supports PC5 interface communication. The processing unit is configured to maintain or skip releasing, based on the capability information obtained by the obtaining unit, the signaling connection between the V2X terminal and the core network device after completion of registration for the V2X terminal.

It should be noted that the communications apparatus according to the fifth aspect is configured to perform the communications method according to the first aspect or the fourth aspect. For specific implementation, refer to the specific implementation of the first aspect or the fourth aspect.

According to a sixth aspect, this application provides a communications apparatus. The apparatus may be a V2X terminal, or may be an apparatus or a chip system in a V2X terminal, or may be an apparatus that can be used with a V2X terminal. The communications apparatus may implement functions performed by the V2X terminal in the foregoing aspect or the possible designs, and the functions may be implemented by hardware, or may be implemented by hardware executing corresponding software. The hardware or the software includes one or more modules corresponding to the foregoing functions. For example, the communications apparatus may include a determining unit and a sending unit.

The determining unit is configured to determine that the V2X terminal transmits V2X service data through PC5 interface communication in a base station scheduling mode, or the V2X terminal transmits V2X service data by using a spectrum controlled by a current camped cell. The sending unit is configured to send indication information to a core network device when the determining unit determines that the V2X terminal transmits the V2X service data by using the PC5 interface communication in the base station scheduling mode, or that the V2X terminal transmits the V2X service data by using the spectrum controlled by the current camped cell. The indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and an access network device of the V2X terminal after completion of registration for the V2X terminal. The sending unit is further configured to send a resource request message to the access network device of the V2X terminal. The resource request message is used to request a PC5 interface communication resource from the access network device, and the PC5 interface communication resource is used to transmit the V2X service data.

It should be noted that the communications apparatus according to the sixth aspect is configured to perform the communications method according to the second aspect. For specific implementation, refer to the specific implementation of the second aspect.

According to a seventh aspect, this application provides a communications apparatus. The apparatus may be an access network device of a V2X terminal, an apparatus in an access network device, or an apparatus that can be used with an access network device. The communications apparatus may implement functions performed by the access network device in the foregoing aspect or the possible designs, and the functions may be implemented by hardware, or may be implemented by hardware executing corresponding software. The hardware or the software includes one or more modules corresponding to the foregoing functions. For example, the communications apparatus may include a receiving unit and a sending unit.

The receiving unit is configured to receive a resource request message from a V2X terminal, where the resource request message is used to request to allocate a PC5 interface communication resource to the V2X terminal. The sending unit is configured to send indication information to a core network device based on the resource request message received by the receiving unit, where the indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal.

It should be noted that the communications apparatus according to the seventh aspect is configured to perform the communications method according to the third aspect. For specific implementation, refer to the specific implementation of the third aspect.

According to an eighth aspect, an embodiment of this application provides yet another communications apparatus. The apparatus includes a processor, configured to implement the communications method described in the first aspect or the fourth aspect. The apparatus may further include a memory. The memory is coupled to the processor. When executing an instruction stored in the memory, the processor may implement the communications method described in the first aspect or the fourth aspect. The apparatus may further include a communications interface. The communications interface is used by the apparatus to communicate with another device. For example, the communications interface may be a transceiver, a circuit, a bus, a module, or a communications interface of another type. In a possible implementation, the apparatus includes:

the memory, configured to store the instruction; and the processor, configured to: obtain indication information, and maintain or skip releasing a communication connection of a V2X terminal between a core network device and an access network device of the V2X terminal based on the indication information, where the indication information is used to indicate to maintain or skip releasing a signaling connection between the core network device and the V2X terminal after completion of registration for the V2X terminal, or the indication information is used to indicate to maintain or skip releasing the communication connection of the V2X terminal between the core network device and the access network device of the V2X terminal after completion of registration for the V2X terminal.

Alternatively, the processor may be configured to: obtain capability information indicating that a V2X terminal supports PC5 interface communication, and maintain or skip releasing a signaling connection between the V2X terminal and a core network device based on the capability information after completion of registration for the V2X terminal.

It should be noted that the instruction in the memory in this application may be pre-stored, or when the apparatus is used, the instruction may be downloaded from the Internet and then stored. A source of the instruction in the memory is not limited in this application. Coupling in this embodiment of this application is an indirect coupling or a connection between apparatuses, units, or modules, may be in an electrical form, a mechanical form, or another form, and is used for information exchange between the apparatuses, the units, or the modules.

According to a ninth aspect, an embodiment of this application provides yet another communications apparatus. The apparatus may be a V2X terminal, or may be an apparatus or a chip system in a V2X terminal, or may be an apparatus that can be used with a V2X terminal. The apparatus includes a processor, configured to implement the communications method described in the second aspect. The apparatus may further include a memory. The memory is coupled to the processor. When executing an instruction stored in the memory, the processor may implement the communications method described in the second aspect. The apparatus may further include a communications interface. The communications interface is used by the apparatus to communicate with another device. For example, the communications interface may be a transceiver, a circuit, a bus, a module, or a communications interface of another type. In a possible implementation, the apparatus includes:

the memory, configured to store the instruction; and the processor, configured to: when a V2X terminal transmits V2X service data through PC5 interface communication in a base station scheduling mode, or when a V2X terminal transmits V2X service data by using a spectrum controlled by a current camped cell, send indication information to a core network device through a communications interface, where the indication information is used to indicate to maintain or skip releasing a signaling connection between a core network device and the V2X terminal after completion of registration for the V2X terminal, or the indication information is used to indicate to maintain or skip releasing a communication connection of the V2X terminal between the core network device and an access network device of the V2X terminal after completion of registration for the V2X terminal.

The processor may be further configured to send a resource request message to the access network device of the V2X terminal through the communications interface. The resource request message is used to request a PC5 interface communication resource from the access network device, and the PC5 interface communication resource is used to transmit the V2X service data.

According to a tenth aspect, an embodiment of this application provides yet another communications apparatus. The apparatus may be an access network device of a V2X terminal, an apparatus or a chip system in an access network device, or an apparatus that can be used with an access network device. The apparatus includes a processor, configured to implement the communications method described in the third aspect. The apparatus may further include a memory. The memory is coupled to the processor. When executing an instruction stored in the memory, the processor may implement the communications method described in the third aspect. The apparatus may further include a communications interface. The communications interface is used by the apparatus to communicate with another device. For example, the communications interface may be a transceiver, a circuit, a bus, a module, or a communications interface of another type. In a possible implementation, the apparatus includes:

the memory, configured to store the instruction; and the processor, configured to receive a resource request message from the V2X terminal through a communications interface, where the resource request message is used to request to allocate a PC5 interface communication resource to the V2X terminal; and send indication information to a core network device through the communications interface based on the received resource request message. The indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal.

According to an eleventh aspect, an embodiment of this application further provides a computer-readable storage medium, including an instruction. When the instruction is run on a computer, the computer is enabled to perform the communications method according to any one of the foregoing aspects or the possible implementations.

According to a twelfth aspect, an embodiment of this application further provides a computer program product. When the computer program product runs on a computer, the computer is enabled to perform the communications method according to any one of the foregoing aspects or the possible implementations.

According to a thirteenth aspect, an embodiment of this application provides a chip system. The chip system includes a processor, may further include a memory, and is configured to implement functions of the core network device in the foregoing aspects. The chip system may include a chip, or may include a chip and another discrete component.

According to a fourteenth aspect, an embodiment of this application provides a chip system. The chip system includes a processor, may further include a memory, and is configured to implement functions of the V2X terminal in the foregoing aspects. The chip system may include a chip, or may include a chip and another discrete component.

According to a fifteenth aspect, an embodiment of this application provides a chip system. The chip system includes a processor, may further include a memory, and is configured to implement functions of the access network device in the foregoing aspects. The chip system may include a chip, or may include a chip and another discrete component.

According to a sixteenth aspect, a communications system is provided. The communications system includes a first communications apparatus and a second communications apparatus. The first communications apparatus may implement the method in any one of the first aspect or the fourth aspect, or the possible implementations of the first aspect or the fourth aspect, and the second communications apparatus may implement the method in any one of the second aspect or the possible implementations of the second aspect. For example, the first communications apparatus is a core network device, and the second communications apparatus is a V2X terminal.

According to a seventeenth aspect, a communications system is provided. The communications system includes a third communications apparatus and a fourth communications apparatus. The third communications apparatus may implement the method in any one of the first aspect or the fourth aspect, or the possible implementations of the first aspect or the fourth aspect, and the fourth communications apparatus may implement the method in any one of the third aspect or the possible implementations of the third aspect. For example, the third communications apparatus is a core network device, and the fourth communications apparatus is an access network device.

According to an eighteenth aspect, a communications system is provided. The communications system includes a V2X terminal and a core network device. The V2X terminal is configured to send indication information to the core network device when the V2X terminal transmits V2X service data through PC5 interface communication in a base station scheduling mode, or when the V2X terminal transmits V2X service data by using a spectrum controlled by a current camped cell. The indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and an access network device of the V2X terminal after completion of registration for the V2X terminal. The core network device is configured to: obtain the indication information, and maintain or skip releasing the communication connection of the V2X terminal between the core network device and the access network device of the V2X terminal based on the indication information. The V2X terminal is further configured to send a resource request message to the access network device of the V2X terminal. The resource request message is used to request a PC5 interface communication resource from the access network device, and the PC5 interface communication resource is used to transmit the V2X service data.

According to a nineteenth aspect, a communications system is provided. The communications system includes an access network device and a core network device. The access network device is configured to receive a resource request message from a V2X terminal. The resource request message is used to request to allocate a PC5 interface communication resource to the V2X terminal. The access network device is further configured to send indication information to the core network device based on the resource request message. The indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal. The core network device is configured to: obtain the indication information, and maintain or skip releasing the communication connection of the V2X terminal between the core network device and the access network device of the V2X terminal based on the indication information.

According to a twentieth aspect, a communications system is provided. The communications system includes a V2X terminal and a core network device. The V2X terminal is configured to send, to the core network device, capability information used to indicate that the V2X terminal supports PC5 interface communication. The core network device is configured to:

receive the capability information, and maintain or skip releasing a signaling connection between the V2X terminal and the core network device based on the capability information after completion of registration for the V2X terminal.

It should be noted that the core network device in the communications system according to the twelfth aspect is configured to perform the communications method according to the fourth aspect. For specific implementation of the communications method, refer to the specific implementation of the fourth aspect.

Solutions according to the fifth aspect to the twentieth aspect are used to implement the communications methods according to the first aspect to the fourth aspect. Therefore, the solutions may achieve same beneficial effects as solutions according to the first aspect to the fourth aspect. Details are not described herein again.

DESCRIPTION OF EMBODIMENTS

Figure 1:
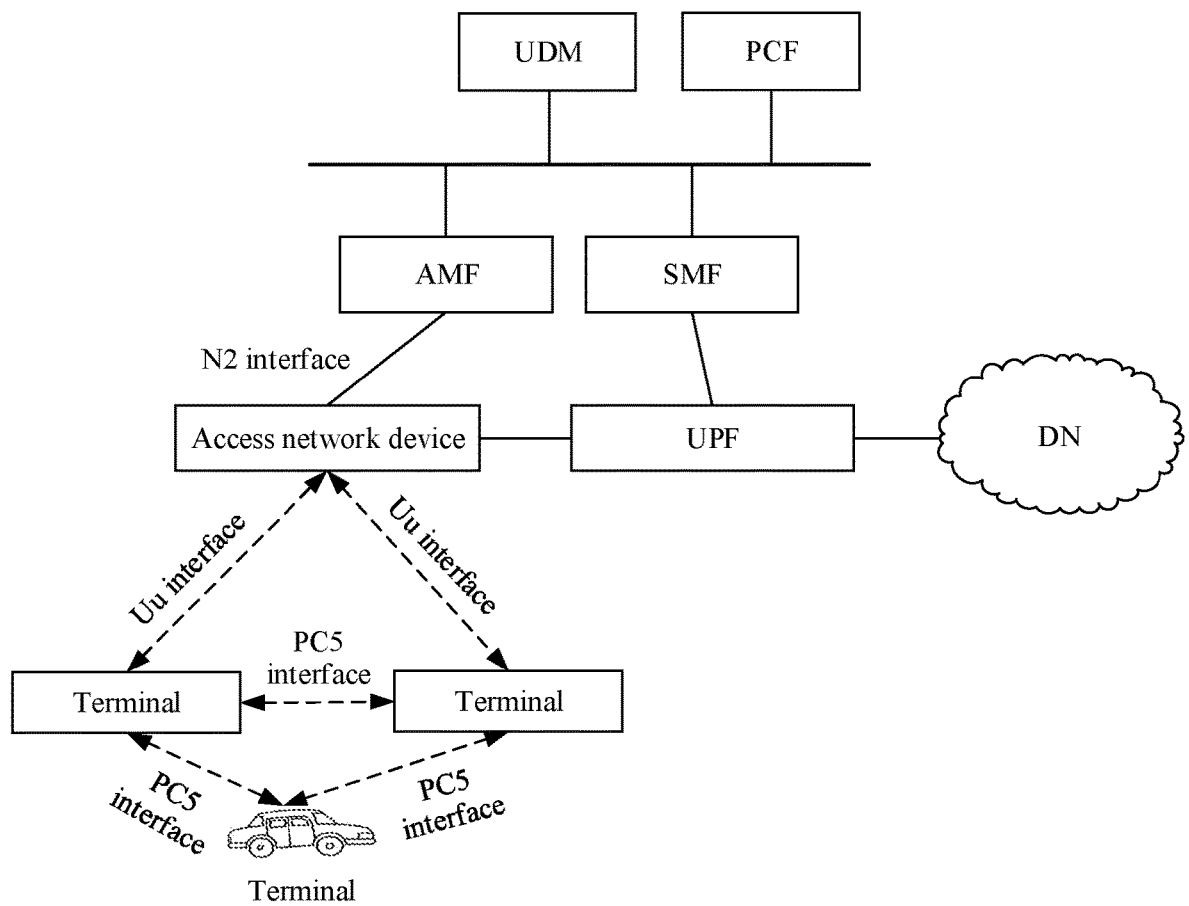
FIG. 1 is a simplified schematic architectural diagram of a communications system according to an embodiment of this application.

In embodiments of this application, to clearly describe the technical solutions in the embodiments of this application, words such as "first" and "second" are used to distinguish between same items or similar items whose functions are basically the same. A person skilled in the art may understand that the terms such as "first" and "second" do not constitute a limitation on a quantity or an execution sequence, and that the terms such as "first" and "second" do not indicate a definite difference. There is no chronological order or no size order between the technical features described by the "first" and the "second".

In the embodiments of this application, the word such as "example" or "for example" is used to give an example, an illustration, or a description. Any embodiment or design scheme described as the word "example" or "for example" in the embodiments of this application should not be explained as being more preferred or having more advantages than another embodiment or design scheme. Exactly, use of the word "example", "for example", or the like is intended to present a relative concept in a specific manner for ease of understanding.

In the descriptions of this application, "I" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more than two. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural.

In the embodiments of this application, "at least one" may also be described as "one or more", and "a plurality of" may be "two, three, four, or more". These are not limited in this application.

A network architecture and a scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and the emergence of new service scenarios, the technical solutions provided in the embodiments of this application are also applicable to similar technical problems.

A method provided in the embodiments of this application may be applied to any communications system supporting V2X service data transmission. The communications system may be a 3rd generation partnership project (3GPP) communications system, for example, a long term evolution (LTE) system, a 5th generation (5G) mobile communications system, or a new radio (NR) system, or may be a non-3GPP communications system. This is not limited.

As shown in FIG. 1, an architectural diagram of a communications system is provided. The communications system may include a terminal, an access network device, a core network device, a data network (DN), and the like. Referring to FIG. 1, the core network device may include an AMF, a policy control function (PCF), unified data management (UDM), a session management function (SMF), and a user plane function (UPF). The following describes an apparatus in this application with reference to FIG. 1.

The terminal may be referred to as user equipment (UE) or a terminal device (terminal). The terminal may support V2X communication, which is, for example, receiving or sending a V2X message. In this case, the terminal may also be referred to as a V2X terminal. The V2X message may include but is not limited to a vehicle to vehicle (V2V) message, a vehicle to person (V2P) message, a vehicle to network (V2N) message, vehicle to infrastructure (V2I) information, an anti-collision message between vehicles, an entertainment application message, a navigation message exchanged between vehicles, and the like. The terminal shown in FIG. 1 may include but is not limited to a vehicle-mounted terminal, a mobile phone, a tablet computer or a computer having a wireless transceiver function, a smart gas station, an intelligent traffic light, and the like.

In the embodiments of this application, the terminal may transmit the V2X message through communications interfaces of different types. A communications interface may include a PC5 interface and/or a Uu interface.

The access network device is responsible for radio resource management, uplink and downlink data classification, and QoS application, completes signaling processing with a control plane network element, and completes functions such as data forwarding with a user plane network element. For example, the access network device may be a base station, a broadband network gateway (BNG), an aggregation switch, a non-3GPP access device, or the like. The base station may be various types of base stations, for example, a macro base station, a micro base station (which is also referred to as a small cell), a relay node, and an access point. This is not limited in the embodiments of this application. A device through which the terminal accesses the core network is referred to as the access network device in this specification, and details are not described herein. For example, the access network device may be an evolved universal terrestrial radio access network (E-UTRAN)

device in a 4G network, a next-generation radio access network (NG-RAN) device in a 5G network, or the like.

Main functions of the AMF include a termination point of a radio access network control plane, a termination point of non-access signaling, mobility management, lawful interception, access authorization/authentication, and the like.

The SMF is used for session management, internet protocol (IP) address allocation and management of the terminal, a function of selecting a manageable user plane, a termination point of a policy control and charging function interface, downlink data notification, and the like.

The UPF is used for packet routing and forwarding, quality of service (QoS) processing of user plane data, and the like. The DN is a network, for example, an Internet network, used to transmit data.

The PCF is configured to provide a parameter related to a UE policy for the terminal, a parameter related to an access and mobility (AM) policy for the AMF, and a parameter related to a session management (SM) policy for the SMF. In a V2X scenario, the PCF provides information such as V2X-related authentication and policy parameters for the terminal and the access network device.

The UDM is configured to manage subscription information, provide the subscription information for a related network element, and the like.

It should be noted that a network consisting of operator network elements other than a RAN may become a core network. In the 4G network, the core network includes network elements such as an MME, an S-GW, a P-GW, and an HSS. In the 5G network, the core network includes network elements such as the AMF, SMF, UPF, UDM, and PCF.

A Uu interface in FIG. 1 is a wireless connection interface between the terminal and the access network device. An N2 interface is a reference point between the access network device and the core network device (AMF), is configured to send a NAS message, and may be further configured to transmit related information for configuring an access network. Therefore, a communication connection between the access network device and the core network device may be referred to as an N2 connection. A PC5 interface is a reference point for user plane ProSe direct communication between terminals for a V2X service.

It should be noted that a network architecture that the embodiments of this application use is not limited to the network architecture shown in FIG. 1. In addition, the network architecture shown in FIG. 1 is merely an example architectural diagram, and a quantity of network elements included in the communications system and names of the network elements are not limited. For example, in addition to the network functional entities shown in FIG. 1, the network shown in FIG. 1 may further include another functional entity. For another example, names of the network elements, interfaces between the network elements, and the protocol layers in the architecture shown in FIG. 1 are merely examples, and may be other names during specific implementation. This is not limited in the embodiments of this application.

The solutions provided in the embodiments of this application may be applied to a process in which a terminal registers with a network and an interaction process between network elements after the registration is completed in a wireless communications system. Before the specific solutions of this application are described, the process in which the terminal registers with the network and the interaction process between the network elements after the registration in the wireless communications system are first briefly described herein.

Figure 2:
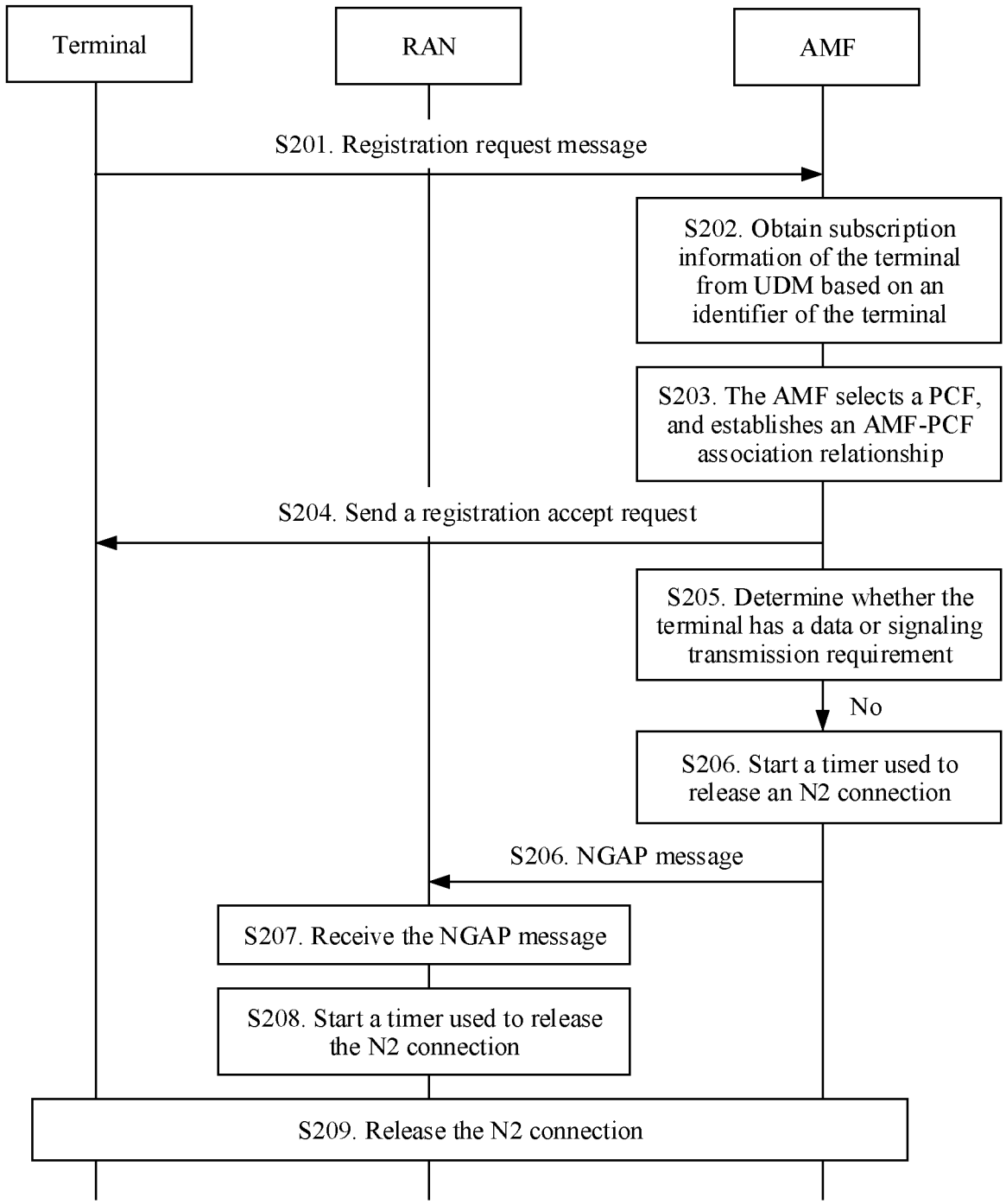
FIG. 2 is a flowchart of a communications method according to an embodiment of this application.

In the wireless communications system, the terminal may send a registration request to the network in a plurality of scenarios such as initial network access, periodic registration, or registration caused by mobility. This is not limited in the embodiments of this application. A 5G communications system is used as an example to describe a registration procedure of the terminal and the interaction process between the network elements after the registration is completed. As shown in FIG. 2, the process may include the following steps.

S201. The terminal sends a registration request message to an AMF.

The registration request message is a NAS message, and the registration request message carries an identifier of the terminal. The identifier of the terminal is used to uniquely indicate the terminal. Content of information about the identifier is not limited in this application.

Further, the registration request message may further include capability information of the terminal, and the capability information is used to indicate a capability that the terminal has.

The registration request message is sent to the AMF via a RAN.

S202. The AMF obtains subscription information of the terminal from UDM based on the identifier of the terminal.

In S202, that a core network device obtains the subscription information of the terminal from the UDM based on the identifier of the terminal may be implemented as follows: The core network device obtains the subscription information of the terminal from the UDM based on the identifier of the terminal and other information of the terminal. The foregoing other information may be the capability information of the terminal or other information. This is not limited in this embodiment of this application.

S203. The AMF selects a PCF, and establishes an AMF-PCF association relationship.

In S203, the core network device may select the corresponding PCF based on the subscription information of the terminal. In S203, the core network device may further send policy-related request information of the terminal to the PCF, so that the PCF updates a policy of the terminal. For example, the core network device may add, to a policy container of the terminal, a policy that has been learned by the terminal, and send the policy container to the PCF. It should be noted that for specific implementation of S203, refer to the standard 3GPP TS 23.502 and the standard 3GPP TS 23.503. Details are not described in this embodiment of this application.

S204. The core network device sends a registration accept message to the terminal.

The registration accept message is a NAS message. The registration accept message sent by the core network device is sent to the access network device by using a terminal context setup request borne on a next generation application protocol (NGAP) interface. The access network device sends the registration accept request to the terminal by using an RRC connection reconfiguration message.

In this case, the terminal completes registration, and establishes an N2 connection between the AMF and the RAN, an RRC connection between the RAN and the terminal, and an N1 connection between the AMF and the terminal. The RAN stores a context of the terminal, and the terminal enters a connected mode.

As shown in FIG. 2, after completion of registration for the terminal, the process of interaction between the network elements includes the following steps.

S205. The AMF determines whether the terminal has a data or signaling transmission requirement.

In S205, if the AMF determines that the terminal has the data or signaling transmission requirement, the AMF maintains the N2 connection between the AMF and the RAN and the N1 connection between the RAN and the terminal, to perform a subsequent communication process. If the AMF determines that the terminal has no data or signaling transmission requirement, S206 is performed.

In S205, how the AMF determines whether the terminal has the data or signaling transmission requirement may be configured based on an actual requirement. This is not limited in this embodiment of this application.

For example, when the terminal still has to-be-processed uplink signaling after the registration is completed, the registration request of the terminal carries an indication (for example, a follow-on request) indicating that a NAS message further needs to be sent. In this case, the AMF may determine that the terminal has the signaling transmission requirement. The NAS message sent by the terminal after the registration may include a NAS message used to establish a PDU session or activate a PDU session.

For another example, if the terminal has registered with the network before, and has established a corresponding PDU session, in registration caused by periodic registration or mobility, the terminal initiates the registration request message in S201 in an idle mode, and the registration request message includes an information element of a session to be activated (IE of a PDU session to-be-activated). In this case, the AMF may determine a data transmission requirement of the terminal.

S206. The AMF starts a timer used to release the N2 connection.

The timer used to release the N2 connection may be a T3540 timer, and duration of the T3540 timer may be 10 seconds. After the T3540 timer expires, S206 is performed.

S206. The AMF sends, to the RAN, an NGAP message used to release the N2 connection.

S207. The RAN receives the NGAP message used to release the N2 connection.

S208. The RAN starts a timer used to release the N2 connection.

The timer used to release the N2 connection may be an inactivity timer. If the RAN receives the data transmission requirement of the terminal in a running process of the inactivity timer, the RAN refuses to release the N2 connection. If the RAN does not receive the data transmission requirement of the terminal after the inactivity timer expires, S209 is performed to release the N2 connection.

S209. Release the N2 connection.

A specific process of releasing the N2 connection may include: The RAN deletes the stored context of the terminal. The RAN sends, to the terminal, a message used to release the N1 connection. The RAN responds, to the AMF, the NGAP message used to release the N2 connection. After S208 is performed, both the N2 connection between the AMF and the RAN and the RRC connection between the RAN and the terminal are released. The RAN stores the context of the terminal, and the terminal enters the idle mode.

The following describes implementations of the embodiments of this application in detail with reference to the accompanying drawings. It should be noted that in the following embodiments of this application, names of messages between network elements, names of parameters in messages, or the like are merely examples, and may be other names during specific implementation. This is not limited in the embodiments of this application.

Figure 3:
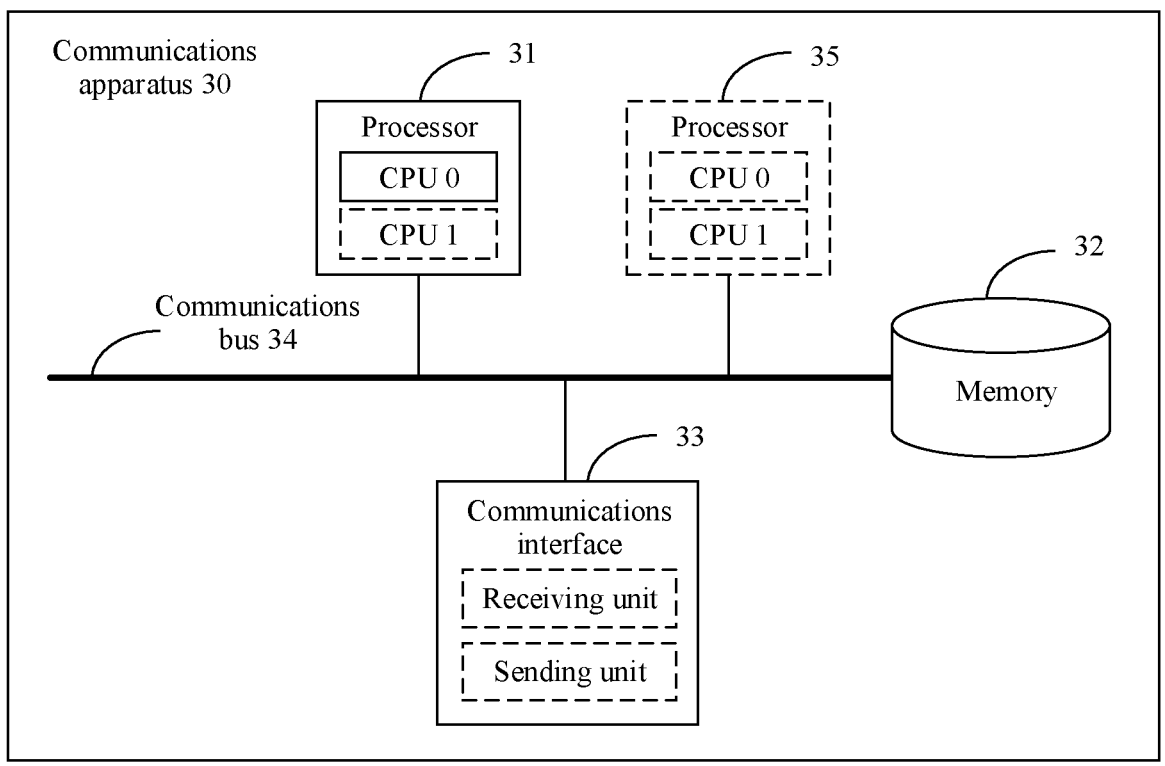
FIG. 3 is a schematic composition diagram of a communications apparatus according to an embodiment of this application.

FIG. 3 is a schematic composition diagram of a communications apparatus 30 according to an embodiment of this application. As shown in FIG. 3, the communications apparatus 30 may include at least one processor 31, a memory 32, a communications interface 33, and a communications bus 34. The following describes each composition component of the communications apparatus 30 in detail with reference to FIG. 3.

The processor 31 may be one processor, or may be a collective name of a plurality of processing elements. For example, the processor 31 may be a central processing unit (CPU) or an application-specific integrated circuit (ASIC), or may be one or more integrated circuits, for example, one or more microprocessors (DSP) or one or more field programmable gate arrays (FPGA), configured to implement the embodiments of this application.

The processor 31 may perform various functions of the communications apparatus 30 by running or executing a software program stored in the memory 32 and invoking data stored in the memory 32. In specific implementation, in an embodiment, the processor 31 may include one or more CPUs, for example, a CPU 0 and a CPU 1 shown in FIG. 3.

In specific implementation, in an embodiment, the communications apparatus 30 may include a plurality of processors, for example, the processor 31 and a processor 35 shown in FIG. 3. Each of the processors may be a single-core processor (single-CPU) or may be a multi-core processor (multi-CPU). The processor herein may refer to one or more devices, circuits, and/or processing cores configured to process data (for example, a computer program instruction).

The memory 32 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 32 is not limited thereto. The memory 32 may exist independently, and is connected to the processor 31 through the communications bus 34. Alternatively, the memory 32 may be integrated with the processor 31. The memory 32 is configured to store a software program for executing the solutions of this application, and the processor 31 controls execution.

The communications interface 33 is configured to communicate with another device or a communications network, such as the Ethernet, a radio access network (RAN), or a wireless local area network (WLAN) through any apparatus such as a transceiver. The communications interface 33 may include a receiving unit and a sending unit.

The communications bus 34 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not mean that there is only one bus or only one type of bus.

It should be noted that the components shown in FIG. 3 do not constitute a limitation on the communications apparatus. In addition to the components shown in FIG. 3, the communications apparatus may include more or fewer components than those shown in the figure, or some components may be combined, or different component arrangements may be used.

In a possible implementation, the processor 31 runs or executes the software program and/or the module stored in the memory 32, and invokes the data stored in the memory 32, to perform the following functions:

obtaining indication information, where the indication information is used to indicate to maintain or skip releasing a signaling connection between a core network device and a V2X terminal after completion of registration for the V2X terminal, or the indication information is used to indicate to maintain or skip releasing a communication connection of a V2X terminal between a core network device and an access network device of the V2X terminal after completion of registration for the V2X terminal; and maintaining or skipping releasing the communication connection of the V2X terminal between the core network device and the access network device of the V2X terminal based on the obtained indication information.

In another possible implementation, the processor 31 runs or executes the software program and/or the module stored in the memory 32, and invokes the data stored in the memory 32, to perform the following functions:

when a V2X terminal in which the communications apparatus 30 is located transmits V2X service data through PC5 interface communication in a base station scheduling mode, or when a V2X terminal in which the communications apparatus 30 is located transmits V2X service data by using a spectrum controlled by a current camped cell, sending indication information to a core network device, where the indication information is used to indicate to maintain or skip releasing a signaling connection between a core network device and the V2X terminal after completion of registration for the V2X terminal, or the indication information is used to indicate to maintain or skip releasing a communication connection of the V2X terminal between a core network device and an access network device of the V2X terminal after completion of registration for the V2X terminal; and sending a resource request message to the access network device, where the resource request message is used to request a PC5 interface communication resource from the access network device, and the PC5 interface communication resource is used to transmit the V2X service data.

In yet another possible implementation, the processor 31 runs or executes the software program and/or the module stored in the memory 32, and invokes the data stored in the memory 32, to perform the following functions:

receiving a resource request message from a V2X terminal, where the resource request message is used to request to allocate a PC5 interface communication resource to the V2X terminal; and sending indication information to a core network device based on the resource request message, where the indication information is used to indicate to maintain or skip releasing a signaling connection between the core network device and the V2X terminal after completion of registration for the V2X terminal, or the indication information is used to indicate to maintain or skip releasing a communication connection of the V2X terminal between the core network device and an access network device of the V2X terminal after completion of registration for the V2X terminal.

Figure 4:
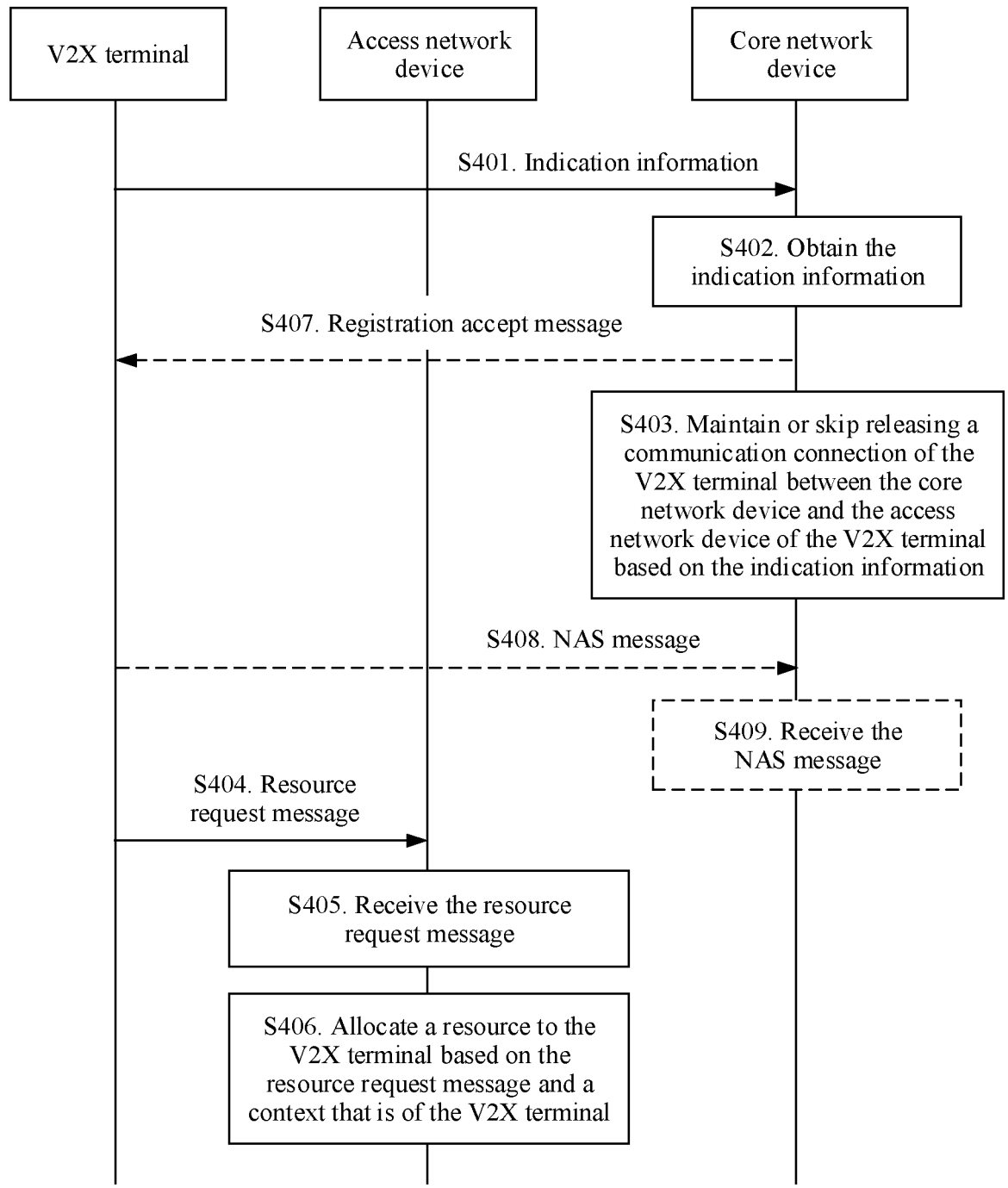
FIG. 4 is a flowchart of a communications method according to an embodiment of this application.

According to one aspect, an embodiment of this application provides a communications method, applied to an interaction process between a V2X terminal, an access network device, and a core network device. FIG. 4 is a flowchart of a communications method according to an embodiment of this application. As shown in FIG. 4, the method may include the following steps.

S401. When the V2X terminal transmits V2X service data through PC5 interface communication in a base station scheduling mode, or when the V2X terminal transmits V2X service data by using a spectrum controlled by a current camped cell, the V2X terminal sends indication information to the core network device.

That the V2X service data is transmitted through the PC5 interface communication in the base station scheduling mode, or the V2X service data is transmitted by using the spectrum controlled by the current camped-on cell may be referred to as mode 1 PC5 interface communication. An essence of the mode 1 PC5 interface communication may be as follows: The access network device allocates a resource used to transmit the V2X service data, where the resource may be used for direct communication between a transmitting end and a receiving end, and the access network device does not need to forward the V2X service data.

It should be understood that in actual application, S401 may also be replaced with the following: When the V2X terminal is in a scenario in which service data does not need to be forwarded and transmitted by the access network device but the access network device needs to allocate a resource for transmitting the V2X service data, the V2X terminal sends indication information to the core network device.

For example, in S401, the V2X terminal may determine, based on a policy configured in the V2X terminal and application layer data generated based on an operation of a user in a V2X application, to transmit the V2X service data through the PC5 interface communication in the base station scheduling mode, or to transmit the V2X service data by using the spectrum controlled by the current camped cell, where the application layer data may be the V2X service data.

Certainly, in actual application, a manner of transmitting the V2X service data may be configured and determined based on an actual requirement. This is not limited in this embodiment of this application.

The indication information may be used to indicate to maintain or skip releasing a signaling connection between the core network device and the V2X terminal after completion of registration for the V2X terminal. Alternatively, the indication information may be used to indicate to maintain or skip releasing a communication connection of the V2X terminal between the core network device and the access network device of the V2X terminal after completion of registration for the V2X terminal, and the communication connection may be an N2 connection.

For example, in wireless communication, the terminal initiates registration to a network, and establishes, in a registration procedure, the signaling connection (for example, an N1 connection in 5G) between the core network device and the terminal, the communication connection (for example, the N2 connection in 5G) of the terminal between the core network device and the access network device of the terminal, and a connection (for example, an RRC connection in 5G) between the terminal and the access network device, so that the terminal enters a connected mode. After completion of registration for the terminal, if the core network device determines that the terminal has no data or signaling transmission requirement, the core network device sends a connection release request message to the access network device, to release the signaling connection between the core network device and the terminal, the communication connection of the terminal between the core network device and the access network device of the terminal, and the connection between the terminal and the access network device. The access network device deletes an internally stored context of the terminal. In this case, the terminal enters an idle mode.

It can be learned that, releasing the signaling connection between the core network device and the terminal, releasing the communication connection of the terminal between the core network device and the access network device of the terminal, releasing the connection between the terminal and the access network device, deleting the internally stored context of the terminal by the access network device, and entering the idle mode by the terminal are equivalent concepts, and can be replaced with each other.

In other words, maintaining or skipping releasing the signaling connection between the core network device and the terminal, maintaining or skipping releasing the communication connection of the terminal between the core network device and the access network device of the terminal, maintaining or skipping releasing the connection between the terminal and the access network device, reserving the internally stored context of the terminal by the access network device, and maintaining the connected mode by the terminal are equivalent concepts, and can be replaced with each other.

Therefore, the indication information described in this application is used to indicate to maintain or skip releasing the signaling connection between the core network device and the V2X terminal after completion of registration for the V2X terminal, or the indication information is used to indicate to maintain or skip releasing the communication connection of the V2X terminal between the core network device and the access network device of the V2X terminal after completion of registration for the V2X terminal. In addition, the indication information may be further used to indicate to maintain or skip releasing the connection between the access network device and the V2X terminal after completion of registration for the V2X terminal, or the indication information may be further used to indicate the access network device to reserve the internally stored context of the terminal after completion of registration for the V2X terminal, or the indication information may be further used to indicate the V2X terminal to maintain the connected mode after completion of registration for the V2X terminal.

It should be noted that specific content of the indication information may be configured based on an actual requirement. This is not limited in this embodiment of this application.

For example, this embodiment of this application provides the following two possible implementations of the indication information.

Manner 1: The indication information may be an implicit indication.

For example, the indication information may include one or more of the following: a type of the V2X terminal, a first indication, and capability information used to indicate that the V2X terminal supports the PC5 interface communication.

The first indication is used to indicate that there is to-be-processed uplink signaling in the V2X terminal. That there is the to-be-processed uplink signaling may be replaced with a case in which there is an uplink non-access stratum (NAS) message other than a to-be-processed first service request, where the first service request is used to activate a user plane resource; or there is a to-be-processed second service request, where the second service request is used not to activate a user plane resource.

For example, the first indication may be an identifier of a follow-on request.

Manner 2: The indication information is an explicit indication.

For example, the indication information may be requesting to maintain or skip releasing the signaling connection between the core network device and the terminal, or requesting to maintain or skip releasing the communication connection of the terminal between the core network device and the access network device of the terminal, or requesting to maintain or skip releasing the connection between the terminal and the access network device, or requesting the access network device to reserve the internally stored context of the terminal, or requesting the terminal to maintain an explicit information element in the connected mode.

In S401, that the V2X terminal sends indication information to the core network device may be implemented in but is not limited to the following two manners.

Implementation A: The V2X terminal sends a registration request message to the core network device, where the registration request message carries the indication information.

The registration request message carries the indication information based on the registration request message in S201.

Implementation B: The V2X terminal sends independent indication information to the core network device.

In Implementation B, an execution occasion of S401 may be selected based on an actual requirement. This is not limited in this embodiment of this application. For example, S401 may be performed in a registration procedure of the V2X terminal, or may be performed after completion of registration for the V2X terminal.

It should be noted that the V2X terminal sends indication information to the core network device in S401 is performed by using the access network device. Processing logic of the access network device in this process is not described in detail in this application.

S402. The core network device obtains the indication information.

A function of the indication information has been described in detail in S401, and details are not described herein again.

The indication information obtained by the core network device in S402 may include one or more of the following: the type of the V2X terminal, the first indication, and the capability information used to indicate that the V2X terminal supports the PC5 interface communication. Alternatively, the indication information obtained by the core network device in S402 may include one or more of the following: the type of the V2X terminal, the explicit indication in the manner 2 in S401, and the capability information used to indicate that the V2X terminal supports the PC5 interface communication.

In a possible implementation, the indication information obtained by the core network device in S402 is the indication information sent by the V2X terminal in S401. In this implementation, the core network device directly receives the indication information from the V2X terminal in S402.

Corresponding to the implementation A and the implementation B in S401, that the core network device receives the indication information from the V2X terminal in S402 may be implemented as follows: The core network device receives the registration request message from the V2X terminal, where the registration request message carries the indication information. Alternatively, the core network device receives the independent indication information sent by the V2X terminal.

In another possible implementation, the type of the V2X terminal and the capability information used to indicate that the V2X terminal supports the PC5 interface communication that are in the indication information obtained by the core network device in S402 are content in subscription information of the V2X terminal. In this implementation, that the core network device obtains the indication information in S402 may be implemented as follows: The core network device receives the indication information from the V2X terminal, and requests the subscription information of the V2X terminal from a subscription information management network element, to obtain the type of the V2X terminal and/or the capability information used to indicate that the V2X terminal supports the PC5 interface communication that are/is in the indication information.

S403. The core network device maintains or skips releasing the communication connection of the V2X terminal between the core network device and the access network device of the V2X terminal based on the indication information.

In a possible implementation, that the core network device maintains or skips releasing the communication connection of the V2X terminal between the core network device and the access network device of the V2X terminal based on the indication information in S403 may be implemented as follows: The core network device skips sending the connection release request message to the access network device based on the indication information after completion of registration for the V2X terminal (that is, after the core network device sends a registration accept message to the V2X terminal).

The connection release request message is used to release the communication connection of the V2X terminal between the core network device and the access network device of the V2X terminal. For example, the connection release request message may be an N2 connection release request in a 5G system.

It should be noted that step S403 may be replaced with the following: The core network device skips sending the connection release request message to the access network device based on the indication information. The core network device skips sending the connection release request message to the access network device based on the indication information after completion of registration for the V2X terminal (that is, after the core network device sends the registration accept message to the V2X terminal).

In another possible implementation, that the core network device maintains or skips releasing the communication connection of the V2X terminal between the core network device and the access network device of the V2X terminal based on the indication information in S403 may be implemented as follows: The core network device skips starting, based on the indication information after completion of registration for the V2X terminal (that is, after the core network device sends a registration accept message to the V2X terminal), a timer for sending the connection release request message to the access network device.

It should be noted that step S403 may be replaced with the following: The core network device skips starting, based on the indication information, a timer for sending the connection release request message to the access network device. The core network device skips starting, based on the indication information after completion of registration for the V2X terminal (that is, after the core network device sends a registration accept message to the V2X terminal), the timer for sending the connection release request message to the access network device.

In the foregoing process of S401 to S403, the access network device reserves the context of the V2X terminal, so that the V2X terminal maintains the connected mode, and the V2X terminal can perform the PC5 interface communication in a process of S404 to S406.

S404. The V2X terminal sends a resource request message to the access network device of the V2X terminal.

The resource request message is used to request a PC5 interface communication resource from the access network device, and the PC5 interface communication resource is used to transmit the V2X service data.

S405. The access network device receives the resource request message from the V2X terminal.

S406. The access network device allocates a resource to the V2X terminal based on the resource request message and the context that is of the V2X terminal.

According to the communications method provided in this application, the core network device maintains or skips releasing the communication connection of the V2X terminal between the core network device and the access network device of the V2X terminal based on the indication information provided by the V2X terminal. In this way, the context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

Optionally, if the V2X terminal adds the indication information to the registration request message for sending in S401, as shown in FIG. 4, the communications method provided in this embodiment of this application may further include S407 after S402 and before S403, to complete a registration procedure of the V2X terminal.

S407. The core network device sends the registration accept message to the V2X terminal.

In a possible implementation, for S407, refer to specific implementation of S204. Details are not described herein again.

In another possible implementation, S407 is implemented as S407a to S407c.

S407a. The core network device sends an NGAP message to the access network device.

The NGAP message includes a registration accept message and a second indication. The second indication is used to indicate the access network device to maintain or skip releasing the communication connection of the V2X terminal between the core network device and the access network device of the V2X terminal.

S407b. The access network device sets first duration based on the second indication.

The first duration is duration in which when it is detected, after the second indication is received, that the V2X terminal has no data to transmit, the communication connection that is of the V2X terminal and that is between the core network device and the access network device of the V2X terminal is released, and the first duration is less than second duration. The second duration is duration that is set in the access network device and in which when it is detected that the V2X terminal has no data to transmit, the communication connection that is of the V2X terminal and that is between the core network device and the access network device of the V2X terminal is released. For example, the second duration is duration of an inactivity timer timer.

If the first duration expires, and the V2X terminal has no data to transmit, the access network device actively initiates release of the communication connection of the V2X terminal between the core network device and the access network device of the V2X terminal.

S407c. The access network device sends an RRC message to the V2X terminal, where the RRC message carries the registration accept message.

Optionally, if the indication information sent by the V2X terminal in S401 includes the first indication, as shown in FIG. 4, the communications method provided in this embodiment of this application may further include S408 and S409.

S408. After receiving the registration accept message, the V2X terminal sends a NAS message to the core network device.

The NAS message sent by the V2X terminal in S408 includes a service request message, and the service request message requesting not to activate a user plane resource.

For example, the service request message requesting not to activate the user plane resource is used to maintain the V2X terminal in the connected mode, or is used to maintain the N2 connection, or is used for not releasing the N2 connection. For example, the service request message requesting not to activate the user plane resource does not carry an information element of a PDU session to be activated. That is, UE does not further activate the user plane resource.

S409. The core network device receives the NAS message.

In S409, the core network device performs "Service Request procedures" in the standard 3GPP TS 23.502. A process is the same as a process in which the V2X terminal switches from the idle mode to the connected mode. Details are not described herein again.

Figure 5:
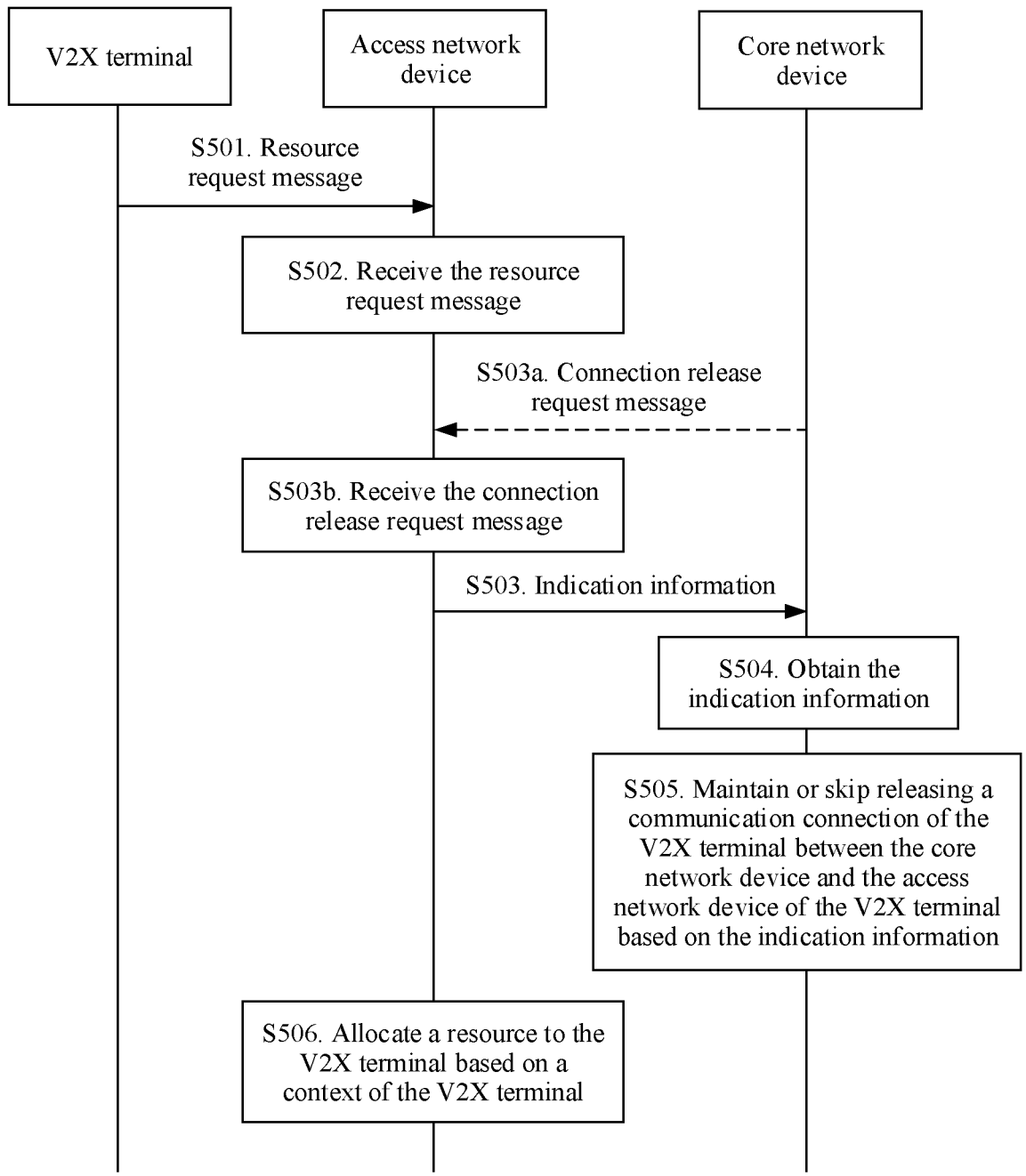
FIG. 5 is a flowchart of another communications method according to an embodiment of this application.

According to another aspect, an embodiment of this application provides another communications method that may be applied to an interaction process of a V2X terminal, an access network device, and a core network device after completion of registration for the V2X terminal in the registration procedure shown in FIG. 2. FIG. 5 is a flowchart of a communications method according to an embodiment of this application. As shown in FIG. 5, the method may include the following steps.

S501. The V2X terminal sends a resource request message to the access network device of the V2X terminal.

The resource request message is used to request a PC5 interface communication resource from the access network device, and the PC5 interface communication resource is used to transmit V2X service data.

S502. The access network device receives the resource request message from the V2X terminal.

If the access network device receives the resource request message from the V2X terminal in S502, it indicates that the V2X terminal is performing mode 1 PC5 interface communication.

S503. The access network device sends indication information to the core network device based on the resource request message.

The indication information may be used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal.

As described above, the indication information described in this application is used to indicate to maintain or skip releasing the signaling connection between the core network device and the V2X terminal after completion of registration for the V2X terminal, or the indication information is used to indicate to maintain or skip releasing the communication connection of the V2X terminal between the core network device and the access network device of the V2X terminal after completion of registration for the V2X terminal. In addition, the indication information may be further used to indicate to maintain or skip releasing a connection between the access network device and the V2X terminal after completion of registration for the V2X terminal, or the indication information may be further used to indicate the access network device to reserve an internally stored context of the terminal after completion of registration for the V2X terminal, or the indication information may be further used to indicate the V2X terminal to maintain a connected mode after completion of registration for the V2X terminal.

It should be noted that specific content of the indication information may be configured based on an actual requirement. This is not limited in this embodiment of this application.

For example, this embodiment of this application provides the following two possible implementations of the indication information.

Implementation a: The indication information is an explicit indication.

For example, the indication information may be requesting to maintain or skip releasing the signaling connection between the core network device and the terminal, or requesting to maintain or skip releasing the communication connection of the terminal between the core network device and the access network device of the terminal, or requesting to maintain or skip releasing the connection between the terminal and the access network device, or requesting the access network device to reserve the internally stored context of the terminal, or requesting the terminal to maintain an explicit information element in the connected mode.

Implementation b: The indication information may be an implicit indication.

For example, the indication information may include: information used to indicate that the V2X terminal is performing PC5 interface communication, or capability information used to indicate that the access network device supports PC5 interface communication.

For example, the indication information may include a reject message of a connection release request message. The connection release request message is used to release the communication connection of the V2X terminal between the core network device and the access network device.

For example, the connection release request message may be an N2 connection release message in a 5G system.

Further, when the indication information includes the reject message of the connection release request message, as shown in FIG. 5, before S503, the communications method provided in this embodiment of this application may further include S503*a* and S503*b*.

S503*a*. The core network device sends the connection release request message to the access network device.

It should be noted that for specific implementation of S503*a*, refer to S206 and S207. Details are not described herein again.

S503*b*. The access network device receives the connection release request message from the core network device.

Further, when the indication information includes the reject message of the connection release request message, S503 may be implemented as follows: The access network device sends the reject message of the connection release request message to the core network device based on the resource request message and the connection release request message.

In a possible implementation, that the access network device sends the reject message to the core network device based on the resource request message and the connection release request message may be implemented as follows: The access network device starts a timer when receiving the resource request message. If the timer does not expire when the access network device receives the connection release request message, the access network device sends the reject message of the connection release request message to the core network device.

S504. The core network device obtains the indication information.

In S504, that the core network device obtains the indication information may be implemented as follows: The core network device receives the indication information from the access network device.

It should be noted that the indication information obtained by the core network device in S504 is the indication information sent by the access network device in S503. Details are not described herein again.

S505. The core network device maintains or skips releasing the communication connection of the V2X terminal between the core network device and the access network device of the V2X terminal based on the indication information.

It should be noted that, for specific implementation of S505, refer to the specific implementation of S403. Details are not described herein again.

S506. The access network device allocates a resource to the V2X terminal based on the context of the V2X terminal.

According to the communications method provided in this application, when the access network device receives the resource request message from the V2X terminal, the access network device determines that the V2X terminal has a PC5 interface communication requirement that the access network device needs to allocate the resource, and the access network device sends the indication information to the core network device, so that the core network device maintains or skips releasing the communication connection of the V2X terminal between the core network device and the access network device of the V2X terminal based on the indication information. In this way, the context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

Figure 6:
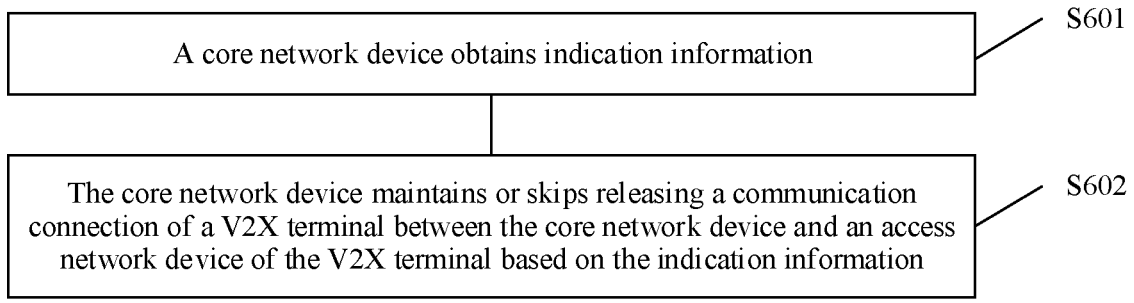
FIG. 6 is a flowchart of yet another communications method according to an embodiment of this application.

According to yet another aspect, an embodiment of this application provides yet another communications method, applied to an interaction process between a V2X terminal, an access network device, and a core network device. FIG. 6 is a flowchart of a communications method according to an embodiment of this application. As shown in FIG. 6, the method may include the following steps.

S601. The core network device obtains indication information.

The indication information may be used to indicate to maintain or skip releasing a signaling connection between the core network device and the V2X terminal after completion of registration for the V2X terminal, or the indication information is used to indicate to maintain or skip releasing a communication connection of the V2X terminal between the core network device and the access network device of the V2X terminal after completion of registration for the V2X terminal.

It should be noted that a function of the indication information has been described in detail in S401, and details are not described herein again.

It should be noted that specific content of the indication information may be configured based on an actual requirement. This is not limited in this embodiment of this application.

For example, this embodiment of this application provides the following two possible implementations of the indication information.

In a possible implementation, the indication information includes one or more of the following: a type of the V2X terminal and capability information indicating that the V2X terminal supports PC5 interface communication. S601 may be implemented as follows: The core network device obtains the indication information from subscription information of the V2X terminal.

In another possible implementation, the indication information may include capability information used to indicate that the access network device supports PC5 interface communication. S601 may be implemented as follows: When performing device-level interaction with the access network device, the core network device receives the indication information from the access network device.

In yet another possible implementation, the indication information includes one or more of the following: a type of the V2X terminal, capability information indicating that the V2X terminal supports PC5 interface communication, and capability information used to indicate that the access network device supports PC5 interface communication.

S602. The core network device maintains or skips releasing the communication connection of the V2X terminal between the core network device and the access network device of the V2X terminal based on the indication information.

For specific implementation of S602, refer to the specific implementation of S403. Details are not described herein again.

According to the communications method provided in this application, the core network device maintains or skips releasing the communication connection of the V2X terminal between the core network device and the access network device of the V2X terminal based on the indication information. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

Figure 6A:
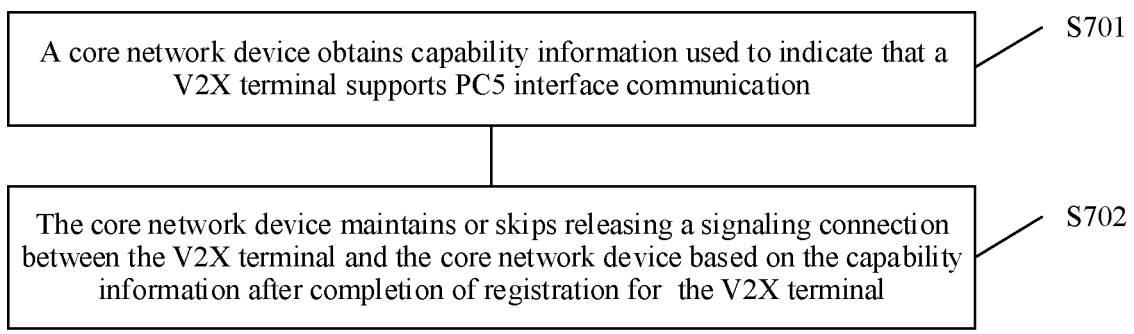
FIG. 6a is a flowchart of yet another communications method according to an embodiment of this application.

According to yet another aspect, an embodiment of this application provides yet another communications method, applied to an interaction process between a V2X terminal, an access network device, and a core network device. FIG. 6*a* is a flowchart of a communications method according to an embodiment of this application. As shown in FIG. 6*a*, the method may include the following steps.

S701. The core network device obtains capability information used to indicate that the V2X terminal supports PC5 interface communication.

The core network device may be an AMF.

In a possible implementation, the core network device may receive the capability information from the V2X terminal in S701.

For example, the capability information may be an implementation of indication information in the foregoing embodiments. For a manner in which the V2X terminal sends the capability information, refer to the description in S401. Details are not described herein again.

In a possible implementation, the capability information may be carried in a registration request message.

For example, the registration request message carries the capability information based on the registration request message in S201.

S702. The core network device maintains or skips releasing a signaling connection between the V2X terminal and the core network device based on the capability information after completion of registration for the V2X terminal.

In a possible implementation, that the core network device maintains or skips releasing a signaling connection between the V2X terminal and the core network device based on the capability information after completion of registration for the V2X terminal in S702 may be implemented as follows: The core network device skips sending a connection release request message to the access network device based on the capability information after completion of registration for the V2X terminal.

The connection release request message is used to release the signaling connection between the V2X terminal and the core network device. For example, the connection release request message may be an N2 connection release request in a 5G system.

In another possible implementation, that the core network device maintains or skips releasing a signaling connection between the V2X terminal and the core network device based on the capability information after completion of registration for the V2X terminal in S702 may be implemented as follows: The core network device maintains or skips releasing the signaling connection between the V2X terminal and the core network device based on subscription information of the V2X terminal and the capability information after completion of registration for the V2X terminal.

The core network device may obtain the subscription information of the V2X terminal from UDM. The subscription information may include service information, authorization information, or the like to which the V2X terminal subscribes.

For example, in S702, the core network device may obtain the subscription information of the V2X terminal from the UDM, and determine, based on the subscription information of the V2X terminal and the capability information, that the V2X terminal is authorized to perform V2X communication on a PC5 interface. The core network device maintains or skips releasing the signaling connection between the V2X terminal and the core network device after completion of registration for the V2X terminal.

It should be noted that, for implementation of S702, refer to specific implementation of S403. Details are not described herein again.

According to the communications method provided in this application, the core network device maintains or skips releasing, based on the capability information indicating that the V2X terminal supports the PC5 interface communication, the signaling connection between the V2X terminal and the core network device after completion of registration for the V2X terminal. In this way, a context of the V2X terminal that is stored in the access network device in a registration phase of the V2X terminal is reserved, so as to support the access network device in allocating a PC5 interface resource to the V2X terminal based on the context of the V2X terminal, thereby ensuring that the V2X terminal implements the PC5 interface communication.

In the foregoing embodiments provided in this application, the method provided in the embodiments of this application is separately described from perspectives of the core network device, the access network device, and the V2X terminal. To implement the functions in the methods provided in the embodiments of this application, the core network device, the access network device, and the V2X terminal may include a hardware structure and/or a software module, and implement the functions in a form of a hardware structure, a software module, or a combination of a hardware structure and a software module. Whether a function of the functions is performed by using the hardware structure, the software module, or the combination of the hardware structure and the software module depends on a specific application and a design constraint of the technical solutions.

Division into modules in the embodiments of this application is an example, is merely logical function division, and may be other division in an actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 7:
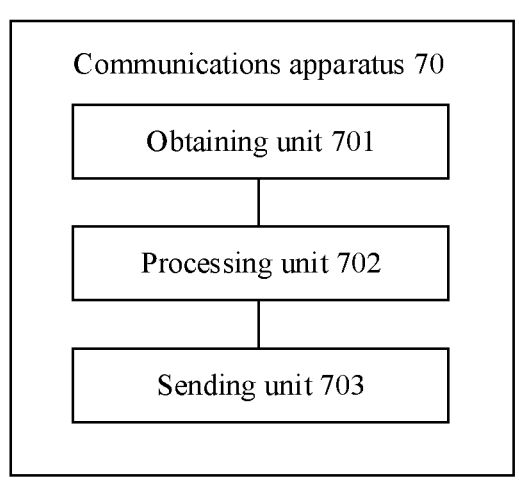
FIG. 7 is a schematic composition diagram of another communications apparatus according to an embodiment of this application.

When each functional module is obtained through division based on each corresponding function, FIG. 7 shows a communications apparatus 70 according to an embodiment of this application. The communications apparatus 70 is configured to implement functions of the core network device in the foregoing method. The communications apparatus 70 may be the core network device, or may be an apparatus in the core network device, or may be an apparatus that can be used with the core network device. The communications apparatus 70 may be a chip system. In this embodiment of this application, the chip system may include a chip, or may include a chip and another discrete component. As shown in FIG. 7, the communications apparatus 70 may include an obtaining unit 701 and a processing unit 702. The obtaining unit 701 is configured to perform S402 in FIG. 4, S504 in FIG. 5, S601 in FIG. 6, S701 in FIG. 6*a*, S1301 in FIG. 13, S1402 in FIG. 14, S1507 in FIG. 15, or S1609 in FIG. 16. The processing unit 702 is configured to perform S403 in FIG. 4, S505 in FIG. 5, S602 in FIG. 6, S702 in FIG. 6*a*, S1304 in FIG. 13, S1405 in FIG. 14, S1508 in FIG. 15, or S1610 in FIG. 16. All related content of the steps in the foregoing method embodiments may be cited in function descriptions of corresponding functional modules. Details are not described herein again.

Figure 13:
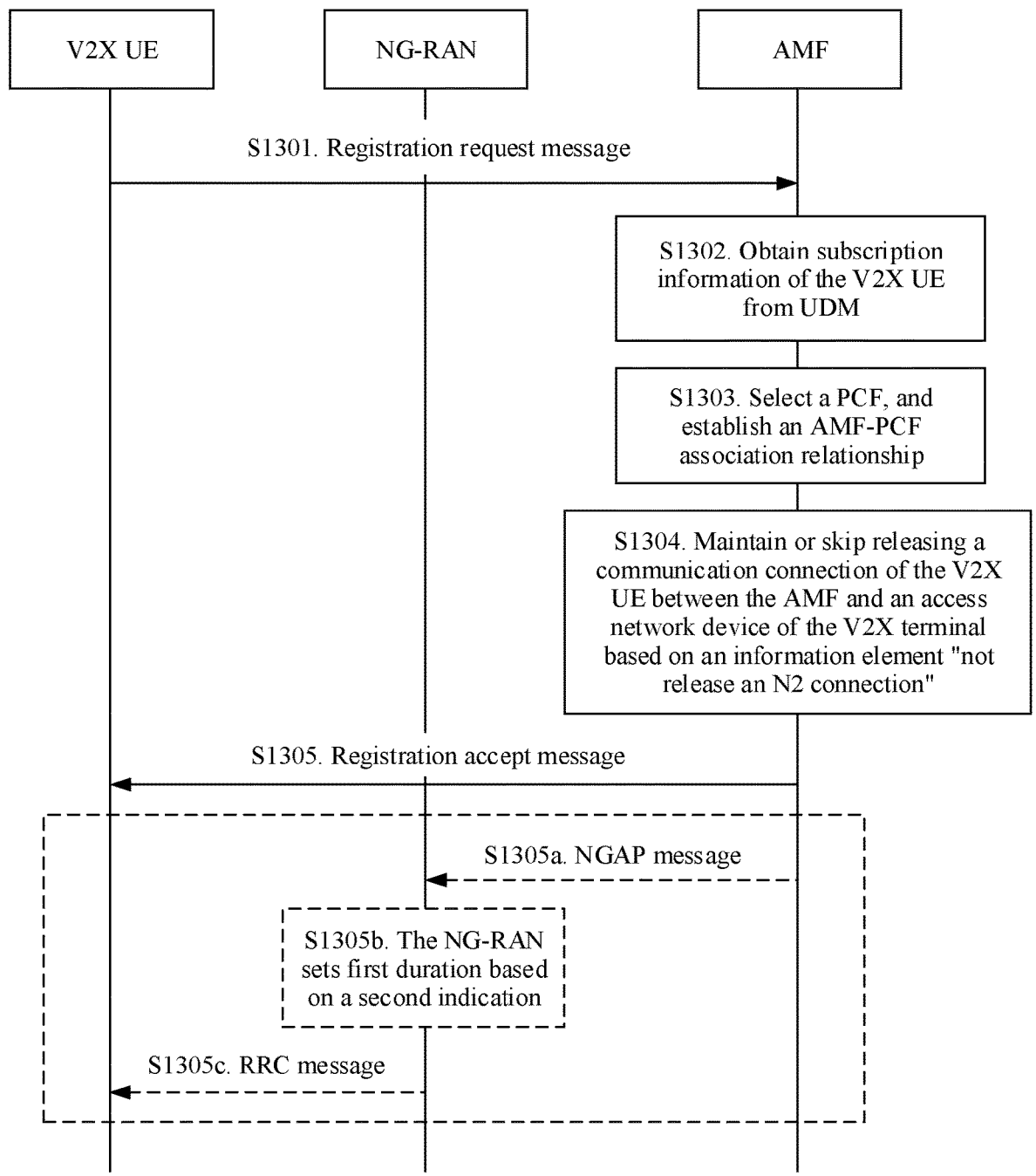
FIG. 13 is a flowchart of yet another communications method according to an embodiment of this application.
Figure 14:
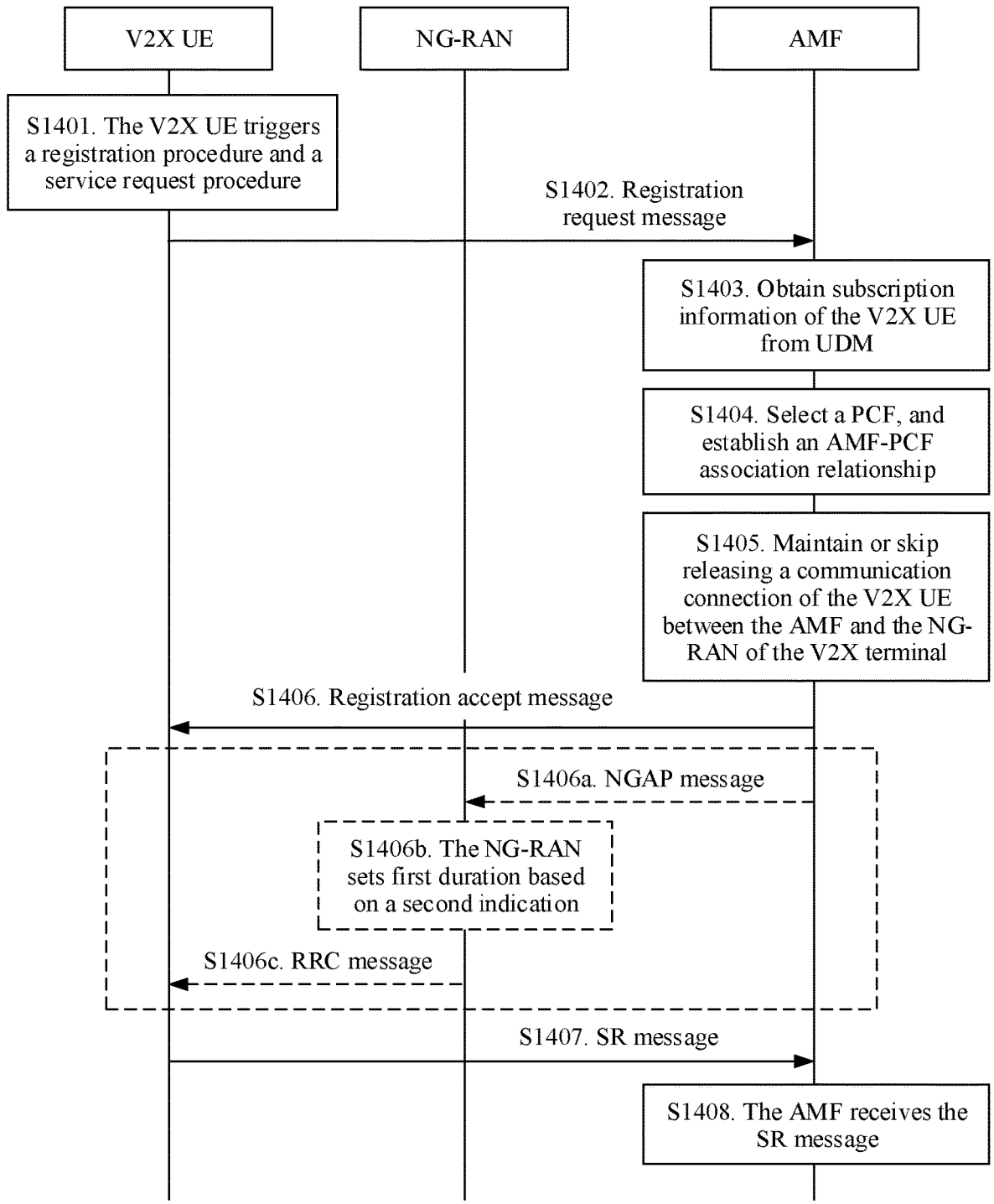
FIG. 14 is a flowchart of yet another communications method according to an embodiment of this application.
Figure 15:
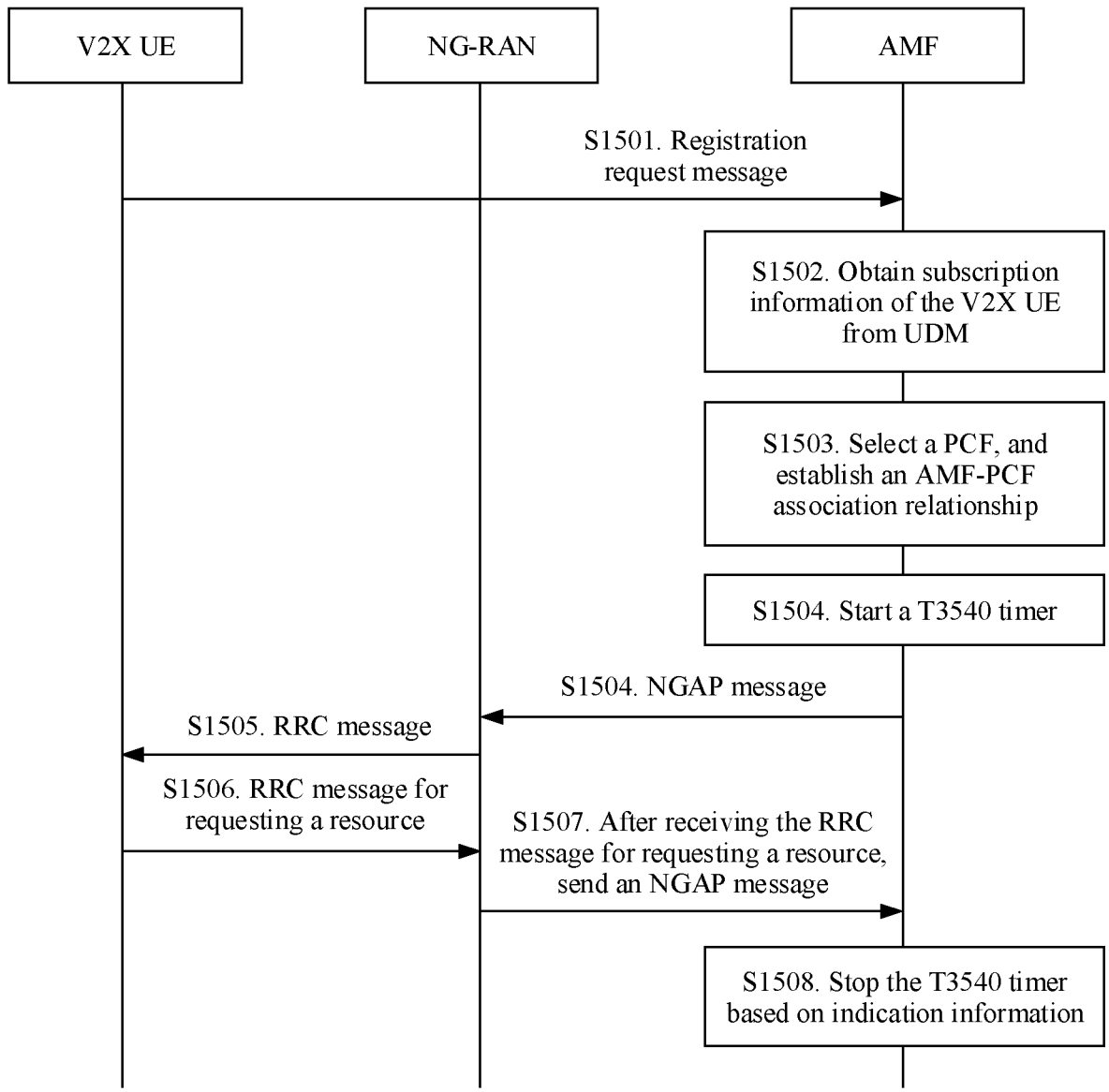
FIG. 15 is a flowchart of yet another communications method according to an embodiment of this application.
Figure 16:
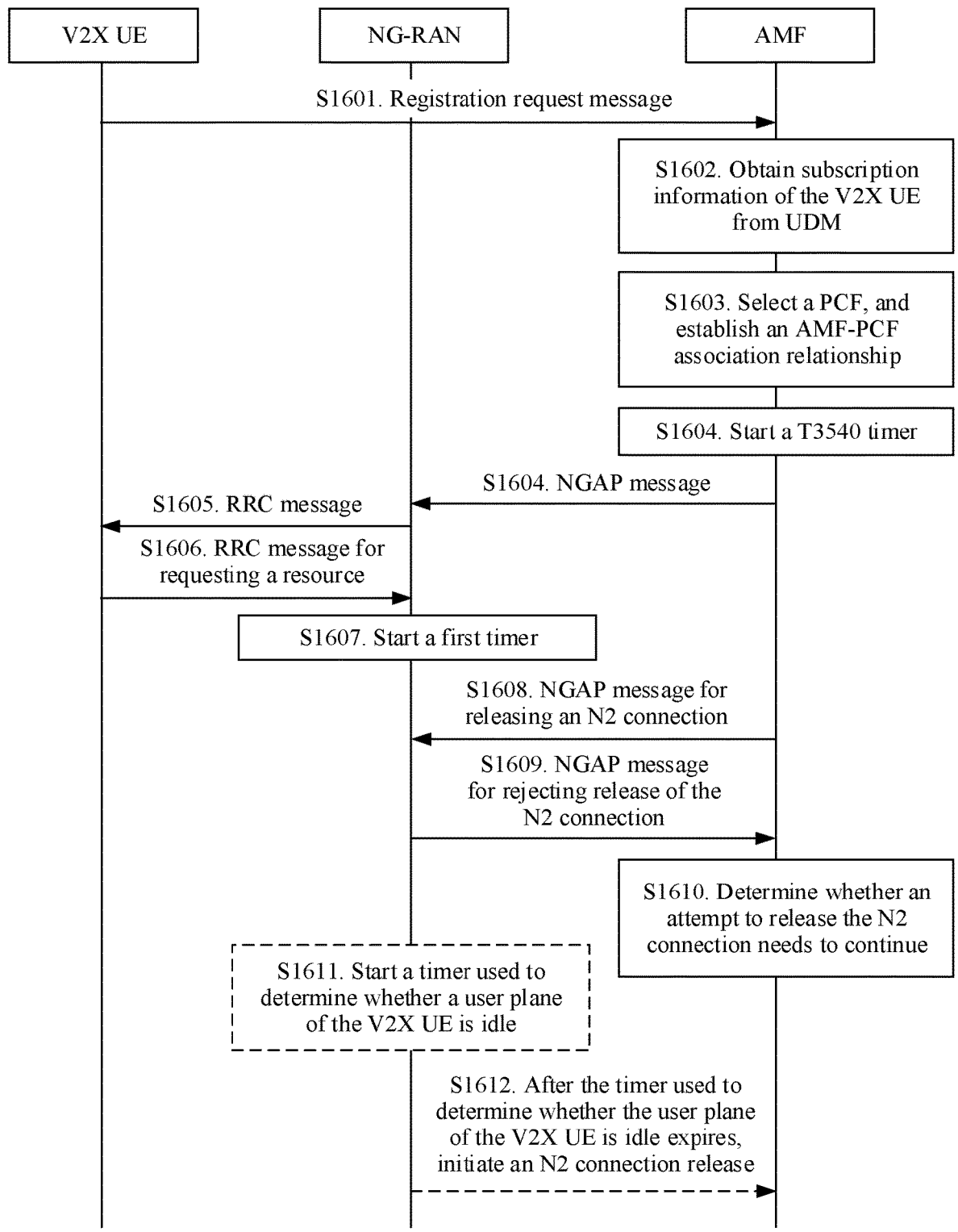
FIG. 16 is a flowchart of yet another communications method according to an embodiment of this application.

Further, as shown in FIG. 7, the communications apparatus 70 may further include a sending unit 703, configured to perform S503a in FIG. 5, S1305 in FIG. 13, S1406 in FIG. 14, S1504 in FIG. 15, or S1604 and S1608 in FIG. 16.

Figure 8:
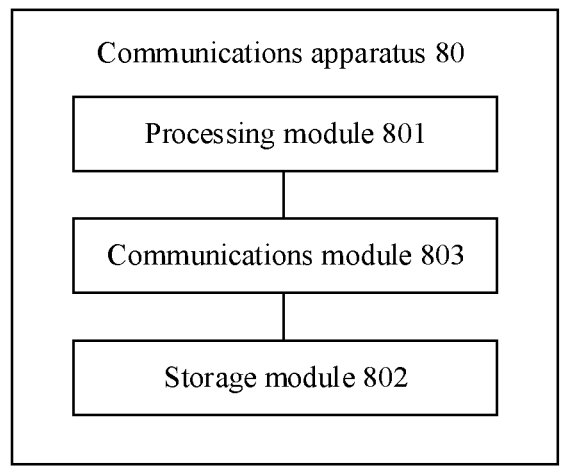
FIG. 8 is a schematic composition diagram of yet another communications apparatus according to an embodiment of this application.

FIG. 8 shows a communications apparatus 80 according to an embodiment of this application. The communications apparatus 80 is configured to implement functions of the core network device in the foregoing method. The communications apparatus 80 may be the core network device, or may be an apparatus in the core network device, or may be an apparatus that can be used with the core network device. The communications apparatus 80 may be a chip system. The communications apparatus 80 includes at least one processing module 801, configured to implement the functions of the core network device in the method provided in the embodiments of this application. For example, the processing module 801 may be configured to perform the processes S402 and S403 in FIG. 4, the processes S504 and S505 in FIG. 5, the processes S601 and S602 in FIG. 6, the processes S701 and S702 in FIG. 6a, S1301 and S1304 in FIGS. 13, S1402 and S1405 in FIGS. 14, S1507 and S1508 in FIG. 15, or S1609 and S1610 in FIG. 16. For details, refer to detailed descriptions in the method examples. Details are not described herein again.

The communications apparatus 80 may further include at least one storage module 802, configured to store a program instruction and/or data. The storage module 802 is coupled to the processing module 801. Coupling in this embodiment of this application is an indirect coupling or a communication connection between apparatuses, units, or modules, may be in an electrical form, a mechanical form, or another form, and is used for information exchange between the apparatuses, the units, or the modules. The processing module 801 may operate in collaboration with the storage module 802. The processing module 801 may execute the program instruction stored in the storage module 802. At least one of the at least one storage module may be included in the processing module.

The communications apparatus 80 may further include a communications module 803, configured to communicate with another device through a transmission medium, so as to determine that an apparatus in the communications apparatus 80 can communicate with the another device. The communications module 803 is configured for communication between the apparatus and the another device. For example, the processing module 801 performs the process S503a in FIG. 5, S1305 in FIG. 13, S1406 in FIG. 14, S1504 in FIG. 15, or S1604 and S1608 in FIG. 16 by using the communications module 803.

When the processing module 801 is a processor, the storage module 802 is a memory, and the communications module 803 is a communications interface, the communications apparatus 80 in FIG. 8 in this embodiment of this application may be the communications apparatus 30 shown in FIG. 3.

As described above, the communications apparatus 70 or the communications apparatus 80 provided in this embodiment of this application may be configured to implement the functions of the core network device that are in the method implemented in the foregoing embodiments of this application. For ease of description, only a part related to this embodiment of this application is shown. For specific technical details that are not disclosed, refer to the embodiments of this application.

Figure 9:
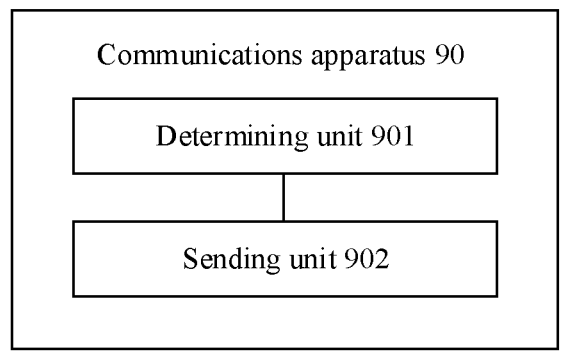
FIG. 9 is a schematic composition diagram of yet another communications apparatus according to an embodiment of this application.

When each functional module is obtained through division based on each corresponding function, FIG. 9 shows a communications apparatus 90 according to an embodiment of this application. The communications apparatus 90 is configured to implement functions of the V2X terminal in the foregoing method. The communications apparatus 90 may be the V2X terminal, or may be an apparatus in the V2X terminal, or may be an apparatus that can be used with the V2X terminal. The communications apparatus 90 may be a chip system. In this embodiment of this application, the chip system may include a chip, or may include a chip and another discrete component. As shown in FIG. 9, the communications apparatus 90 may include a determining unit 901 and a sending unit 902. The determining unit 901 is configured to determine that the V2X terminal transmits V2X service data through PC5 interface communication in a base station scheduling mode, or the V2X terminal transmits V2X service data by using a spectrum controlled by a current camped cell. The sending unit 902 is configured to perform the processes S401 and S404 in FIG. 4, S1301 in FIGS. 13, S1402 and S1407 in FIGS. 14, S1501 and S1506 in FIG. 15, or S1601 and S1606 in FIG. 16. All related content of the steps in the foregoing method embodiments may be cited in function descriptions of corresponding functional modules. Details are not described herein again.

Figure 10:
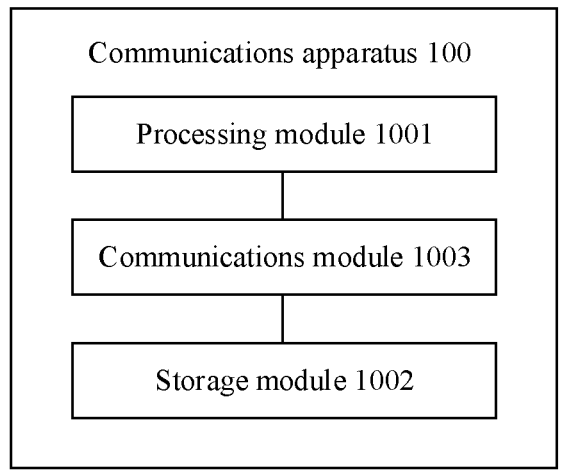
FIG. 10 is a schematic composition diagram of yet another communications apparatus according to an embodiment of this application.

FIG. 10 shows a communications apparatus 100 according to an embodiment of this application. The communications apparatus 100 is configured to implement functions of the V2X terminal in the foregoing method. The communications apparatus 100 may be the V2X terminal, or may be an apparatus in the V2X terminal, or may be an apparatus that can be used with the V2X terminal. The communications apparatus 100 may be a chip system. In this embodiment of this application, the chip system may include a chip, or may include a chip and another discrete component. The communications apparatus 100 includes at least one processing module 1001, configured to implement the functions of the V2X terminal in the method provided in the embodiments of this application. For example, the processing module 1001 may be configured to determine that the V2X terminal transmits V2X service data through PC5 interface communication in a base station scheduling mode, or the V2X terminal transmits V2X service data by using a spectrum controlled by a current camped cell. For details, refer to detailed descriptions in the method examples. Details are not described herein.

The communications apparatus 100 may further include at least one storage module 1002, configured to store a program instruction and/or data. The storage module 1002 is coupled to the processing module 1001. Coupling in this embodiment of this application is an indirect coupling or a communication connection between apparatuses, units, or modules, may be in an electrical form, a mechanical form, or another form, and is used for information exchange between the apparatuses, the units, or the modules. The processing module 1001 may operate in collaboration with the storage module 1002. The processing module 1001 may execute the program instruction stored in the storage module 1002. At least one of the at least one storage module may be included in the processing module.

The communications apparatus 100 may further include a communications module 1003, configured to communicate with another device through a transmission medium, so that an apparatus in the communications apparatus 100 can communicate with the another device. The communications module 1003 is configured for communication between the apparatus and the another device. For example, the processing module 1001 performs the processes S401 and S404 in FIG. 4, S1301 in FIGS. 13, S1402 and S1407 in FIGS. 14, S1501 and S1506 in FIG. 15, or S1601 and S1606 in FIG. 16 by using the communications module 1003.

When the processing module 1001 is a processor, the storage module 1002 is a memory, and the communications module 1003 is a communications interface, the communications apparatus 100 in FIG. 10 in this embodiment of this application may be the communications apparatus 30 shown in FIG. 3.

As described above, the communications apparatus 90 or the communications apparatus 100 provided in this embodiment of this application may be configured to implement the functions of the V2X terminal that are in the method implemented in the foregoing embodiments of this application. For ease of description, only a part related to this embodiment of this application is shown. For specific technical details that are not disclosed, refer to the embodiments of this application.

Figure 11:
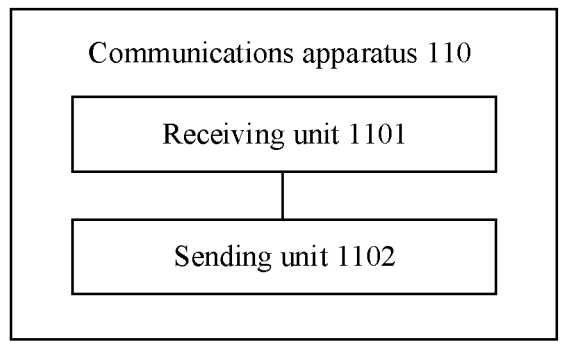
FIG. 11 is a schematic composition diagram of yet another communications apparatus according to an embodiment of this application.

When each functional module is obtained through division based on each corresponding function, FIG. 11 shows a communications apparatus 110 according to an embodiment of this application. The communications apparatus 110 is configured to implement functions of the access network device in the foregoing method. The communications apparatus 110 may be the access network device, or may be an apparatus in the access network device, or may be an apparatus that can be used with the access network device. The communications apparatus 1100 may be a chip system. In this embodiment of this application, the chip system may include a chip, or may include a chip and another discrete component. As shown in FIG. 11, the communications apparatus 110 may include a receiving unit 1101 and a sending unit 1102. The receiving unit 1101 is configured to perform S502 and S503b in FIGS. 5, S1504 and S1506 in FIG. 15, or S1604, S1606, and S1608 in FIG. 16. The sending unit 1102 is configured to perform S503 in FIGS. 5, S1505 and S1507 in FIG. 15, or S1605, S1609, and S1612 in FIG. 16. All related content of the steps in the foregoing method embodiments may be cited in function descriptions of corresponding functional modules. Details are not described herein again.

Figure 12:
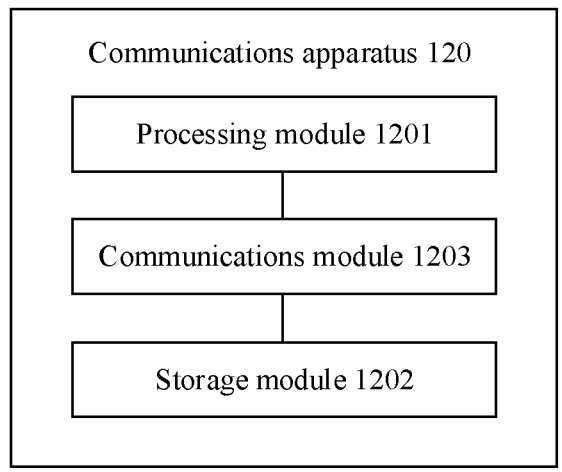
FIG. 12 is a schematic composition diagram of yet another communications apparatus according to an embodiment of this application.

FIG. 12 shows a communications apparatus 120 according to an embodiment of this application. The communications apparatus 120 is configured to implement functions of the access network device in the foregoing method. The communications apparatus 120 may be the access network device, or may be an apparatus in the access network device, or may be an apparatus that can be used with the access network device. The communications apparatus 120 may be a chip system. The communications apparatus 120 includes at least one processing module 1201, configured to implement functions of the access network device in the method provided in the embodiments of this application. For details, refer to detailed descriptions in the method examples. Details are not described herein again.

The communications apparatus 120 may further include at least one storage module 1202, configured to store a program instruction and/or data. The storage module 1202 is coupled to the processing module 1201. Coupling in this embodiment of this application is an indirect coupling or a communication connection between apparatuses, units, or modules, may be in an electrical form, a mechanical form, or another form, and is used for information exchange between the apparatuses, the units, or the modules. The processing module 1201 may operate in collaboration with the storage module 1202. The processing module 1201 may execute the program instruction stored in the storage module 1202. At least one of the at least one storage module may be included in the processing module.

The communications apparatus 120 may further include a communications module 1203, configured to communicate with another device through a transmission medium, so as to determine that an apparatus in the communications apparatus 120 can communicate with the another device. The communications module 1203 is configured for communication between the apparatus and the another device. For example, the processing module 1201 performs the processes S502, S503, and S503b in FIGS. 5, S1504, S1505, S1506, and S1507 in FIG. 15, or S1604, S1605, S1606, S1608, S1609 and S1612 in FIG. 16 by using the communications module 1203.

When the processing module 1201 is a processor, the storage module 1202 is a memory, and the communications module 1203 is a communications interface, the communications apparatus 120 in FIG. 12 in this embodiment of this application may be the communications apparatus 30 shown in FIG. 3.

As described above, the communications apparatus 110 or the communications apparatus 120 provided in this embodiment of this application may be configured to implement the functions of the core network device that are in the method implemented in the foregoing embodiments of this application. For ease of description, only a part related to this embodiment of this application is shown. For specific technical details that are not disclosed, refer to the embodiments of this application.

Solutions provided in the embodiments of this application are described in detail below by using specific examples.

According to one aspect, an embodiment of this application provides a communications method. The communications method is applied to an interaction process between a V2X terminal (V2X UE), an access network device (NG-RAN), and a core network device (AMF) in a 5G communications system. FIG. 13 is a flowchart of the communications method. As shown in FIG. 13, the method may include the following steps.

S1301. The V2X UE has a mode 1 PC5 communication requirement, and the V2X UE sends a registration request message to the AMF, where the registration request message carries an information element for not releasing an N2 connection.

The information element for not releasing an N2 connection is the explicit indication information in the manner 2 described in S401. A function of the information element "not release an N2 connection" is: requesting to maintain or skip releasing an N1 connection between the AMF and the V2X UE, or requesting to maintain or skip releasing the N2 connection of the V2X UE between the AMF and the NG-RAN of the V2X UE, requesting to maintain or skip releasing an RRC connection between the V2X UE and the NG-RAN, requesting the NG-RAN to reserve an internally stored context of the V2X UE, or request the V2X UE to maintain a connected mode.

It should be noted that the registration request message in S1301 is based on the registration request message in S201, and carries the information element for not releasing an N2 connection.

S1302. The AMF obtains subscription information of the V2X UE from UDM based on identification information of the V2X UE.

It should be noted that for specific implementation of S1302, refer to S202. Details are not described herein again.

S1303. The AMF selects a PCF, and establishes an AMF-PCF association relationship.

It should be noted that for specific implementation of S1303, refer to S203. Details are not described herein again.

S1304. The AMF maintains or skips releasing a communication connection of the V2X UE between the AMF and the access network device of the V2X terminal based on the information element for not releasing an N2 connection.

In S1304, the AMF may determine, based on the information element "not release an N2 connection" in the registration request message and at least one of the following information: a type of the V2X UE (for example, a type of UE is V2X), capability information of the V2X UE (for example, the UE supports PC5 interface communication), and capability information of the NG-RAN (for example, the NG-RAN supports the PC5 interface communication), to maintain or skip releasing a communication connection of the V2X UE between the AMF and the access network device of the V2X terminal.

The capability information of the V2X UE may be a capability in the subscription information of the V2X UE, or may be the capability information sent by the V2X UE. This is not limited in this embodiment of this application.

For example, when the AMF receives the information element for not releasing an N2 connection, and subscription information of the UE indicates that the type of the UE is V2X, the AMF does not release the N2 connection.

For another example, when the AMF receives the information element for not releasing an N2 connection, and the UE supports the PC5 interface communication, the AMF does not release the N2 connection.

For another example, when the AMF receives the information element for not releasing an N2 connection, subscription information of the UE indicates that the type of the UE is V2X, and the UE supports the PC5 interface communication, the AMF does not release the N2 connection.

It should be noted that for specific implementation of S1304, refer to S403. Details are not described herein again.

S1305. The AMF sends a registration accept message to the V2X UE.

In a possible implementation, for S1305, refer to specific implementation of S204. Details are not described herein again.

In another possible implementation, S1305 may be implemented as S1305a to S1305c.

S1305a. The AMF sends an NGAP message to the NG-RAN.

The NGAP message includes a registration accept message and a second indication.

The second indication is used to indicate the NG-RAN to maintain or skip releasing the N2 connection of the V2X UE between the AMF and the NG-RAN.

S1305b. The NG-RAN sets first duration based on the second indication.

For specific implementation of S1305b, refer to S407b. Details are not described herein again.

S1305c. The NG-RAN sends an RRC message to the V2X UE, where the RRC message carries the registration accept message.

According to another aspect, an embodiment of this application provides a communications method. The communications method is applied to an interaction process between a V2X terminal (V2X UE), an access network device (NG-RAN), and a core network device (AMF) in a 5G communications system. FIG. 14 is a flowchart of the communications method. As shown in FIG. 14, the method may include the following steps.

S1401. The V2X UE has a mode 1 PC5 communication requirement, and the V2X UE triggers a registration procedure+a service request procedure (Registration Request+ Service Request).

S1402: The V2X UE sends a registration request message to the AMF, where the registration request message carries an identifier (identity, ID) of a follow-on request.

The ID of the follow-on request is the first indication described in S401, and is used to indicate that there is to-be-processed uplink signaling in the V2X UE.

It should be noted that the registration request message in S1402 is based on the registration request message in S201, and carries the ID of the follow-on request.

S1403. The AMF obtains subscription information of the V2X UE from UDM based on identification information of the V2X UE.

It should be noted that for specific implementation of S1403, refer to S202. Details are not described herein again.

S1404. The AMF selects a PCF, and establishes an AMF-PCF association relationship.

It should be noted that for specific implementation of S1404, refer to S203. Details are not described herein again.

S1405. The AMF maintains or skips releasing a communication connection of the V2X UE between the AMF and the NG-RAN of the V2X terminal based on the ID of the follow-on request.

In S1405, the AMF may maintain or skip releasing the communication connection of the V2X UE between the AMF and the access network device of the V2X terminal based on the ID of the follow-on request in the registration request message, and the subscription information of the V2X UE (for example, the type of the UE is V2X) or capability information of the V2X UE (for example, the UE supports PC5 interface communication).

The capability information of the V2X UE may be a capability in the subscription information of the V2X UE, or may be the capability information sent by the V2X UE. This is not limited in this embodiment of this application.

S1406. The AMF sends a registration accept message to the V2X UE.

In a possible implementation, for S1406, refer to specific implementation of S204. Details are not described herein again.

In another possible implementation, S1406 may be implemented as S1406a to S1406c.

S1406a. The AMF sends an NGAP message to the NG-RAN.

The NGAP message includes a registration accept message and a second indication. The second indication is used to indicate the NG-RAN to maintain or skip releasing an N2 connection of the V2X UE between the AMF and the NG-RAN.

S1406b. The NG-RAN sets first duration based on the second indication.

For specific implementation of S1406b, refer to S407b. Details are not described herein again.

S1406c. The NG-RAN sends an RRC message to the V2X UE, where the RRC message carries the registration accept message.

S1407. After receiving the registration accept message, the V2X UE sends a service request (SR) message to the AMF.

The SR message is used to request not to activate a user plane resource.

For example, the SR message is used to maintain the V2X UE in a connected mode, or is used to maintain the N2 connection, or is used for not releasing the N2 connection. The SR message does not carry an information element of a PDU session to be activated. That is, the UE does not further activate the user plane resource (in other words, does not activate a PDU session).

S1408. The AMF receives the SR message.

In S1408, the AMF performs "Service Request procedures" in the standard 3GPP TS 23.502. A process is the same as a process in which the V2X terminal switches from an idle mode to the connected mode. Details are not described herein again.

According to yet another aspect, an embodiment of this application provides yet another communications method. The communications method is applied to an interaction process between a V2X terminal (V2X UE), an access network device (NG-RAN), and a core network device (AMF) in a 5G communications system. FIG. 15 is a flowchart of the communications method. As shown in FIG. 15, the method may include the following steps.

S1501. The V2X UE sends a registration request message to the AMF.

It should be noted that for specific implementation of S1501, refer to S201. Details are not described herein again.

S1502. The AMF obtains subscription information of the V2X UE from UDM based on identification information of the V2X UE.

It should be noted that for specific implementation of S1502, refer to S202. Details are not described herein again.

S1503. The AMF selects a PCF, and establishes an AMF-PCF association relationship.

It should be noted that for specific implementation of S1503, refer to S203. Details are not described herein again.

S1504. The AMF sends an NGAP message carrying a registration accept message to the NG-RAN, and starts a T3540 timer.

After the T3540 timer expires, the AMF releases a communication connection of the V2X UE between the AMF and the access network device of the V2X terminal.

S1505. The NG-RAN sends an RRC message to the V2X UE, where the RRC message carries the registration accept message.

S1506. After the V2X UE receives the registration accept message, if the V2X UE has a mode 1 PC5 communication requirement, the V2X UE sends, to the NG-RAN, an RRC message for requesting a resource.

S1507. After receiving the RRC message for requesting a resource, the NG-RAN sends an NGAP message to the AMF, where the NGAP message carries indication information.

The indication information may be used to notify the AMF that the V2X UE is performing PC5 interface communication.

In a possible implementation, S1507 may be replaced with the following: After the NG-RAN receives the RRC message for requesting a resource, if the V2X UE is in a connected mode, the NG-RAN sends an NGAP message to the AMF, where the NGAP message carries indication information. That is, this solution is applicable only to a case in which the T3540 timer of the AMF does not expire.

S1508. The AMF stops the T3540 timer based on the indication information.

In S1508, the AMF stops the T3540 timer based on the indication information, to maintain or skip releasing the communication connection of the V2X UE between the AMF and the access network device of the V2X terminal.

According to yet another aspect, an embodiment of this application provides yet another communications method. The communications method is applied to an interaction process between a V2X terminal (V2X UE), an access network device (NG-RAN), and a core network device (AMF) in a 5G communications system. FIG. 16 is a flowchart of the communications method. As shown in FIG. 16, the method may include the following steps.

S1601. The V2X UE sends a registration request message to the AMF.

It should be noted that for specific implementation of S1601, refer to S201. Details are not described herein again.

S1602. The AMF obtains subscription information of the V2X UE from UDM based on identification information of the V2X UE.

It should be noted that for specific implementation of S1602, refer to S202. Details are not described herein again.

S1603. The AMF selects a PCF, and establishes an AMF-PCF association relationship.

It should be noted that for specific implementation of S1603, refer to S203. Details are not described herein again.

S1604. The AMF sends an NGAP message carrying a registration accept message to the NG-RAN, and starts a T3540 timer.

After the T3540 timer expires, the AMF sends, to the NG-RAN, an NGAP message used to release an N2 connection, to release a communication connection of the V2X UE between the AMF and the access network device of the V2X terminal.

S1605. The NG-RAN sends an RRC message to the V2X UE, where the RRC message carries the registration accept message.

S1606. After the V2X UE receives the registration accept message, if the V2X UE has a mode 1 PC5 communication requirement, the V2X UE sends, to the NG-RAN, an RRC message for requesting a resource.

S1607. After receiving the RRC message for requesting a resource, the NG-RAN starts a first timer.

S1608. The NG-RAN receives the NGAP message that is sent by the AMF and that is used to release the N2 connection.

If the NG-RAN receives the NGAP message used to release the N2 connection in S1608 and the first timer expires, the NG-RAN releases the N2 connection with reference to S209. When the NG-RAN receives the NGAP message used to release the N2 connection in S1608 and the first timer does not expire, the NG-RAN performs S1609.

S1609. The NG-RAN sends, to the AMF, an NGAP message used to reject release of the N2 connection.

Optionally, the NGAP message that is sent by the NG-RAN to the AMF and that is used to reject release of the N2 connection may carry a specific reject cause value. The cause value may be that the V2X UE is performing mode 1 PC5 interface communication.

S1610. The AMF determines, based on the cause value in the NGAP message from the NG-RAN, whether an attempt to release the N2 connection needs to continue.

For example, if the N2 connection needs to be released due to an AMF failure, the AMF sends an NGAP message again. If the N2 connection needs to be released due to only a case in which the V2X UE is performing the mode 1 PC5 interface communication, the AMF does not further send an NGAP message.

Optionally, as shown in FIG. 16, after S1609, the communications method may further include S1611 and S1612, so as to avoid that the N2 connection is not released after the V2X UE mode 1 PC5 interface communication ends.

S1611. The NG-RAN starts a timer used to determine whether a user plane of the V2X UE is idle.

S1612. After the timer used to determine whether the user plane of the V2X UE is idle expires, the NG-RAN initiates an N2 connection release.

According to yet another aspect, an embodiment of this application provides a communications system. The communications system includes a first communications apparatus and a second communications apparatus. The first communications apparatus may implement functions of a core network device, and the second communications apparatus may implement functions of a V2X terminal. For example, the first communications apparatus is the core network device described in the embodiments of this application, and the second communications apparatus is the V2X terminal described in the embodiments of this application.

According to yet another aspect, an embodiment of this application provides a communications system. The communications system includes a third communications apparatus and a fourth communications apparatus. The third communications apparatus may implement functions of a core network device, and the fourth communications apparatus may implement functions of an access network device. For example, the third communications apparatus is the core network device described in the embodiments of this application, and the fourth communications apparatus is the access network device described in the embodiments of this application.

In another form of this embodiment, a computer-readable storage medium is provided. The computer-readable storage medium stores an instruction. When the instruction is executed, the method in the foregoing method embodiments is performed.

In another form of this embodiment, a computer program product including an instruction is provided. When the instruction is executed, the method in the foregoing method embodiments is performed.

An embodiment of this application further provides a chip system. The chip system includes a processor, configured to implement the technical methods in the embodiments of the present disclosure. In a possible design, the chip system further includes a memory, configured to store a program instruction and/or data that are/is necessary for the communications device in this embodiment of the present disclosure. In a possible design, the chip system further includes a memory, configured for the processor to invoke application program code stored in the memory. The chip system may include one or more chips, or may include a chip and another discrete device. This is not limited in this embodiment of this application.

The method or algorithm steps described with reference to the content disclosed in this application may be implemented by hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components. Alternatively, the memory may be coupled to the processor. For example, the memory may exist independently, and is connected to the processor by using a bus. Alternatively, the memory may be integrated with the processor. The memory may be configured to store application program code for executing the technical solutions provided in the embodiments of this application, and the processor controls the execution. The processor is configured to execute application program code stored in the memory, to implement the technical solutions provided in the embodiments of this application.

The foregoing descriptions about implementations allow a person skilled in the art to clearly understand that, for the purpose of convenient and brief description, division into only the foregoing functional modules is used as an example for illustration. In actual application, the foregoing functions can be allocated to different functional modules for implementation based on a requirement. That is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the method described in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications method, comprising:
   obtaining, by a core network device, capability information indicating that a vehicle to everything (V2X) terminal supports PC5 interface communication;
   determining, by the core network device, based on a subscription information of the V2X terminal and the capability information, that the V2X terminal is authorized to perform V2X communication on a PC5 interface; and
   skipping releasing, by the core network device, a signaling connection between the V2X terminal and the core network device after completion of V2X terminal registration for the V2X terminal.

2. The method according to claim 1, wherein the obtaining, by the core network device, the capability information of the V2X terminal comprises:
   receiving, by the core network device, the capability information from the V2X terminal.

3. The method according to claim 2, wherein the capability information is carried in a registration request message.

4. The method according to claim 1, wherein the skipping releasing, by the core network device, of the signaling connection between the V2X terminal and the core network device comprises:
   skipping sending, by the core network device, a connection release request message to an access network device based on the capability information after completion of the V2X terminal registration.

5. The method according to claim 1, wherein the skipping releasing, by the core network device, of the signaling connection comprises:
   skipping releasing, by the core network device, the signaling connection between the V2X terminal and the core network device after completion of the V2X terminal registration.

6. The method according to claim 1, wherein the core network device is an access and mobility management function (AMF).

7. A core network device, comprising:
   a non-transitory memory storing instructions;
   at least one processor in communication with the memory, the at least one processor configured, upon execution of the instructions, to perform the following steps:
   obtain capability information indicating that a vehicle to everything (V2X) terminal supports PC5 interface communication;
   determine, based on a subscription information of the V2X terminal and the capability information, that the V2X terminal is authorized to perform V2X communication on a PC5 interface; and
   skip releasing a signaling connection between the V2X terminal and a core network device after completion of V2X terminal registration for the V2X terminal.

8. The communications apparatus according to claim 7, wherein the at least one processor is configured to execute the instructions to receive the capability information from the V2X terminal.

9. The communications apparatus according to claim 8, wherein the capability information is carried in a registration request message.

10. The communications apparatus according to claim 7, wherein the at least one processor is configured to execute the instructions to skip sending a connection release request message to an access network device based on the capability information after completion of the V2X terminal registration.

11. The communications apparatus according to claim 7, wherein the at least one processor is configured to execute the instructions to skip releasing the signaling connection between the V2X terminal and the core network device after completion of the V2X terminal registration.

12. The communications apparatus according to claim 7, wherein the core network device is an access and mobility management function (AMF).

13. A non-transitory computer-readable storage media storing computer instructions that configure at least one processor, upon execution of the instructions, to perform the following steps:
   obtaining capability information indicating that a vehicle to everything (V2X) terminal supports PC5 interface communication;
   determining, based on a subscription information of the V2X terminal and the capability information, that the V2X terminal is authorized to perform V2X communication on a PC5 interface; and
   skipping releasing a signaling connection between the V2X terminal and a core network device after completion of V2X terminal registration for the V2X terminal.

14. The storage medium according to claim 13, wherein the instructions further configure the at least one processor to receive the capability information from the V2X terminal.

15. The storage medium according to claim 14, wherein the capability information is carried in a registration request message.

16. The storage medium according to claim 13, wherein the instructions further configure the at least one processor to perform the step of:
   skipping sending a connection release request message to an access network device based on the capability information after completion of the V2X terminal registration.

17. The storage medium according to claim 13, wherein the instructions further configure the at least one processor to perform the step of:
   skipping releasing the signaling connection between the V2X terminal and the core network device after completion of the V2X terminal registration.

* * * * *